(12) United States Patent
McKee

(10) Patent No.: US 7,967,039 B2
(45) Date of Patent: Jun. 28, 2011

(54) SEAL ASSEMBLY FOR A SOURCE OF PRESSURIZED FLUID

(75) Inventor: Joseph R. McKee, Ventura, CA (US)

(73) Assignee: Ausco Inc., Port Washington, NY (US)

(*) Notice: Subject to any disclaimer, the term of this patent is extended or adjusted under 35 U.S.C. 154(b) by 543 days.

(21) Appl. No.: 12/111,286

(22) Filed: Apr. 29, 2008

(65) Prior Publication Data

US 2010/0038575 A1    Feb. 18, 2010

Related U.S. Application Data

(63) Continuation-in-part of application No. 11/951,637, filed on Dec. 6, 2007.

(51) Int. Cl.
*B65B 1/04* (2006.01)
(52) U.S. Cl. .......................... 141/302; 141/197; 251/333
(58) Field of Classification Search .................... 141/98, 141/192, 197, 301, 302; 89/1.51, 1.54, 1.806; 137/613; 244/137.4; 251/333
See application file for complete search history.

(56) References Cited

U.S. PATENT DOCUMENTS

| | | | |
|---|---|---|---|
| 3,319,791 A | 5/1967 | Horne | |
| 3,731,905 A | 5/1973 | Piet | |
| 3,903,914 A | 9/1975 | Topham-Clements | |
| 4,173,986 A * | 11/1979 | Martin | 137/613 |
| 4,408,722 A | 10/1983 | Frelund | |
| 4,763,690 A | 8/1988 | Martin | |
| 4,850,392 A | 7/1989 | Crump et al. | |
| 5,687,952 A * | 11/1997 | Arnold et al. | 251/335.3 |
| 6,619,325 B2 * | 9/2003 | Gray, Jr. | 138/30 |
| 6,745,992 B2 | 6/2004 | Yang et al. | |
| 6,869,060 B2 | 3/2005 | Barber et al. | |
| 7,270,140 B2 * | 9/2007 | Aderholt et al. | 137/71 |

FOREIGN PATENT DOCUMENTS

GB    112112    12/1917

OTHER PUBLICATIONS

International Search Report dated Feb. 13, 2009 for patent application No. PCT/US2008/085717.
International Search Report dated Jun. 19, 2009 for patent application No. PCT/US2009/042097.

* cited by examiner

*Primary Examiner* — Timothy L Maust
(74) *Attorney, Agent, or Firm* — F. Chau & Associates, LLC

(57) ABSTRACT

A valve system includes a source of pressurized fluid comprising an orifice through which the pressurized fluid flows away from the source, and a poppet comprising a groove and a seal positioned in the groove, wherein the seal plugs the orifice when the poppet is in a closed position, and wherein the poppet and the seal move through the orifice against a flow of the pressurized fluid to allow the pressurized fluid to flow through the orifice and away from the source. The seal may include an O-ring.

19 Claims, 30 Drawing Sheets

SEAL ASSEMBLY FOR A SOURCE OF PRESSURIZED FLUID

CROSS-REFERENCE TO RELATED APPLICATION

This application is a Continuation-In-Part of U.S. application Ser. No. 11/951,637, filed on Dec. 6, 2007, the disclosure of which is incorporated herein in its entirety by reference.

BACKGROUND OF THE INVENTION

1. Technical Field

The present disclosure relates to a seal assembly for a source of pressurized fluid, and more particularly, to a low leakage seal assembly positioned on a poppet for sealing a pressurized fluid source.

2. Discussion of the Related Art

A store is, for example, a bomb, missile, rocket and the like. Pressurized gas has been used to actuate store ejector mechanisms, such as, for example, pistons and suspension and release equipment on bomb racks, to permit forceful ejection of a store while a vehicle is in motion. It is to be understood that a vehicle may be an air, sea, or land vehicle, and the present disclosure will refer to aircraft for ease of description, but is not limited thereto.

In many tactical situations, the military wants to fly a bombing mission, return to base, quickly re-load with more bombs, and fly again. However, known gas supply systems and store ejection mechanisms, such as pneumatically powered bomb racks, prevent quick mission turn-around of tactical aircraft. For example, in conventional systems, aircraft must wait until an on-board compressor, for compressing the gas used to actuate the store ejector mechanisms, recharges a gas-supply system. Existing gas supply systems rely only on an onboard recharging system, and due to compressor size, cannot recharge the system in a short time. In addition, existing systems require manual resetting of system components, which also increases turn-around time.

Further, existing systems fail to perform equally well under varied environmental conditions, and may undesirably vary the time to release a store at, for example, different temperatures and air pressures.

Accordingly, there is need for a gas supply system that can operate to desired specifications under all environmental conditions, and that provides for automatic resetting of system components and high flow output from replaceable, refillable and reusable gas storage vessels.

SUMMARY OF THE INVENTION

Embodiments of the present invention provide a self contained, fast acting, high flow gas supply system for pneumatic store ejection that utilizes an easily replaceable gas storage vessel, and that allows for quick mission turn-around.

A valve system, in accordance with an embodiment of the present invention, comprises a container comprising pressurized fluid and an orifice, and a poppet comprising a groove and an O-ring positioned in the groove, wherein the O-ring seals the orifice when the poppet is in a closed position, and wherein the poppet including the O-ring moves into the container through the orifice to allow the pressurized fluid to escape from the container through the orifice.

The pressurized fluid may be a gas or liquid. The poppet may further comprise a back-up ring positioned in the groove adjacent the O-ring.

The thickness of the O-ring may be greater than a depth of the groove.

The groove may be formed along an outer circumference of the poppet in a substantial U-shape. Right and left sides of the groove may protrude from an outer wall of the poppet.

The groove may be recessed into an outer wall of the poppet, and may be formed in a substantial U-shape.

A valve system, in accordance with an embodiment of the present invention, comprises a source of pressurized fluid comprising an orifice through which the pressurized fluid flows away from the source, and a poppet comprising a groove and a seal positioned in the groove, wherein the seal plugs the orifice when the poppet is in a closed position, and wherein the poppet and the seal move through the orifice against a flow of the pressurized fluid to allow the pressurized fluid to flow through the orifice and away from the source. The seal may include an O-ring.

A seal assembly for plugging an orifice in a valve, in accordance with an embodiment of the present invention, comprises a body comprising a groove, an O-ring positioned in the groove, wherein the body including the O-ring is moved through the orifice against a flow of pressurized fluid to open the seal assembly and allow the pressurized fluid to flow through the orifice.

The valve may be one of a relief valve, a check valve, a solenoid valve, a shut-off valve or a regulator. The body may be a poppet. The pressurized fluid may be a gas or a liquid. The body may further comprise a back-up ring positioned in the groove adjacent the O-ring.

BRIEF DESCRIPTION OF THE DRAWINGS

Exemplary embodiments of the present invention will be described below in more detail, with reference to the accompanying drawings, of which.

DETAILED DESCRIPTION OF EXEMPLARY EMBODIMENTS

Figure 1:
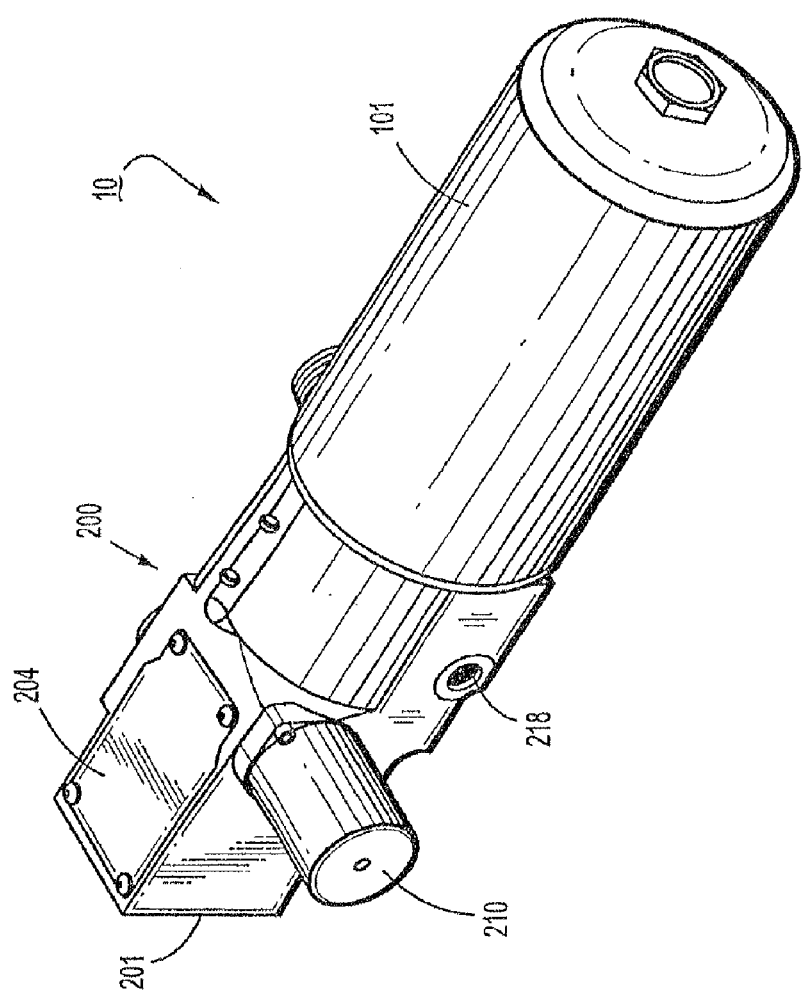
FIG. 1 is a perspective view of a gas supply system including a gas storage vessel and a receiver assembly, according to an embodiment of the present invention.
Figure 2:
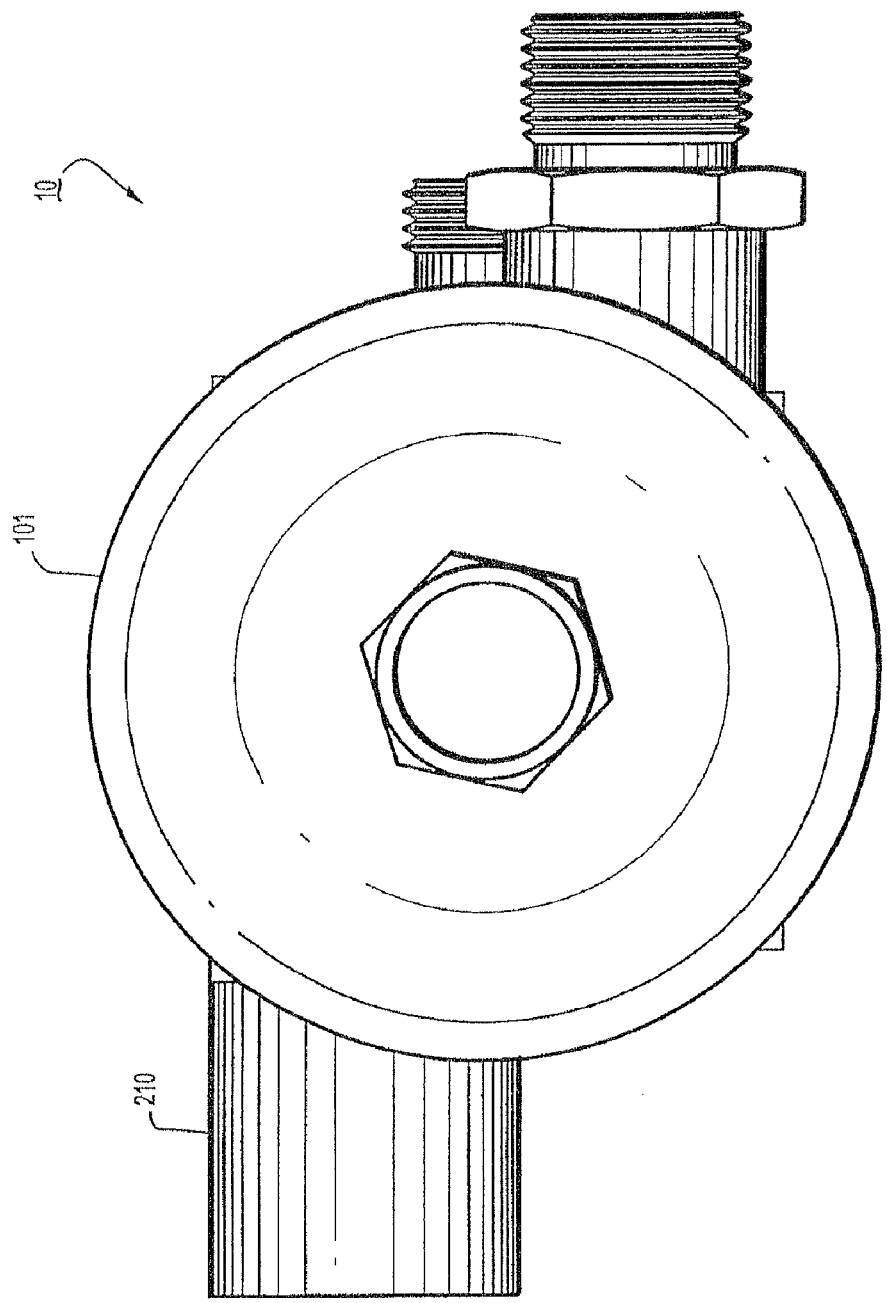
FIG. 2 is a front view of the gas supply system, according to an embodiment of the present invention.
Figure 3:
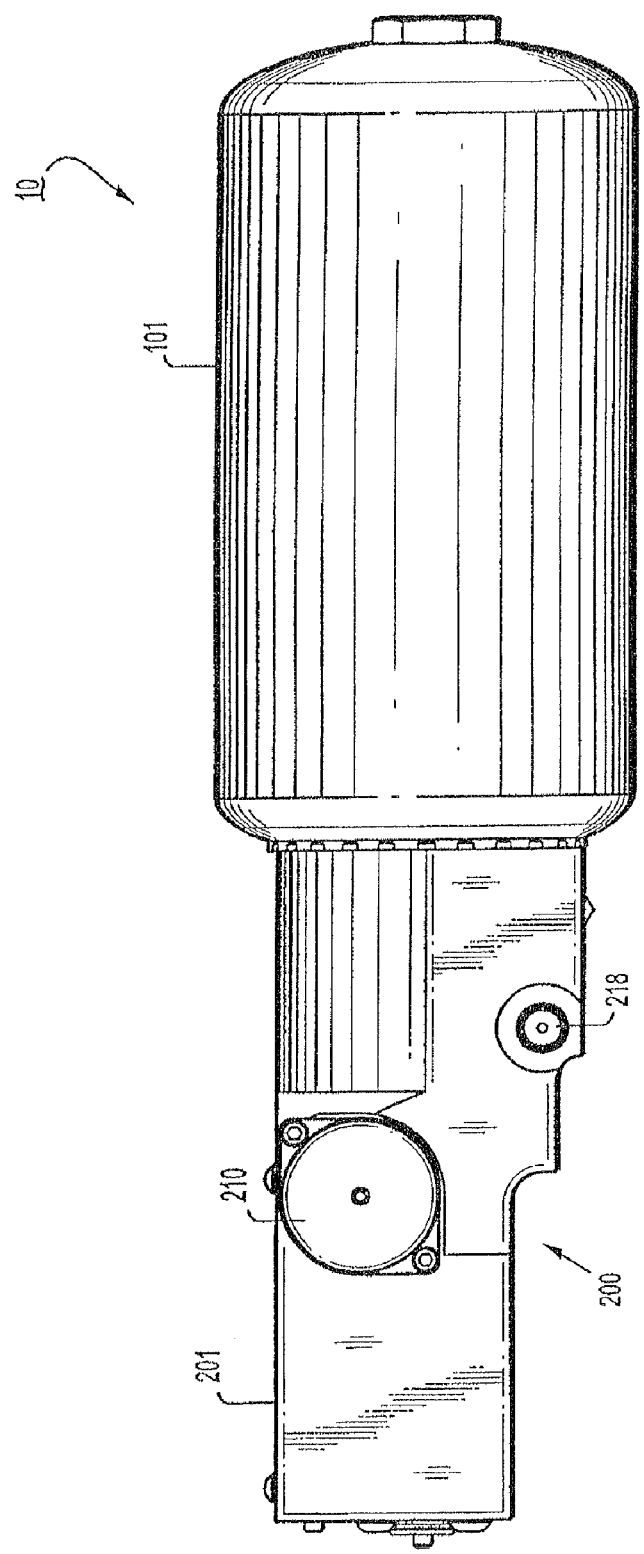
FIG. 3 is a right-side view of the gas supply system, according to an embodiment of the present invention.
Figure 4:
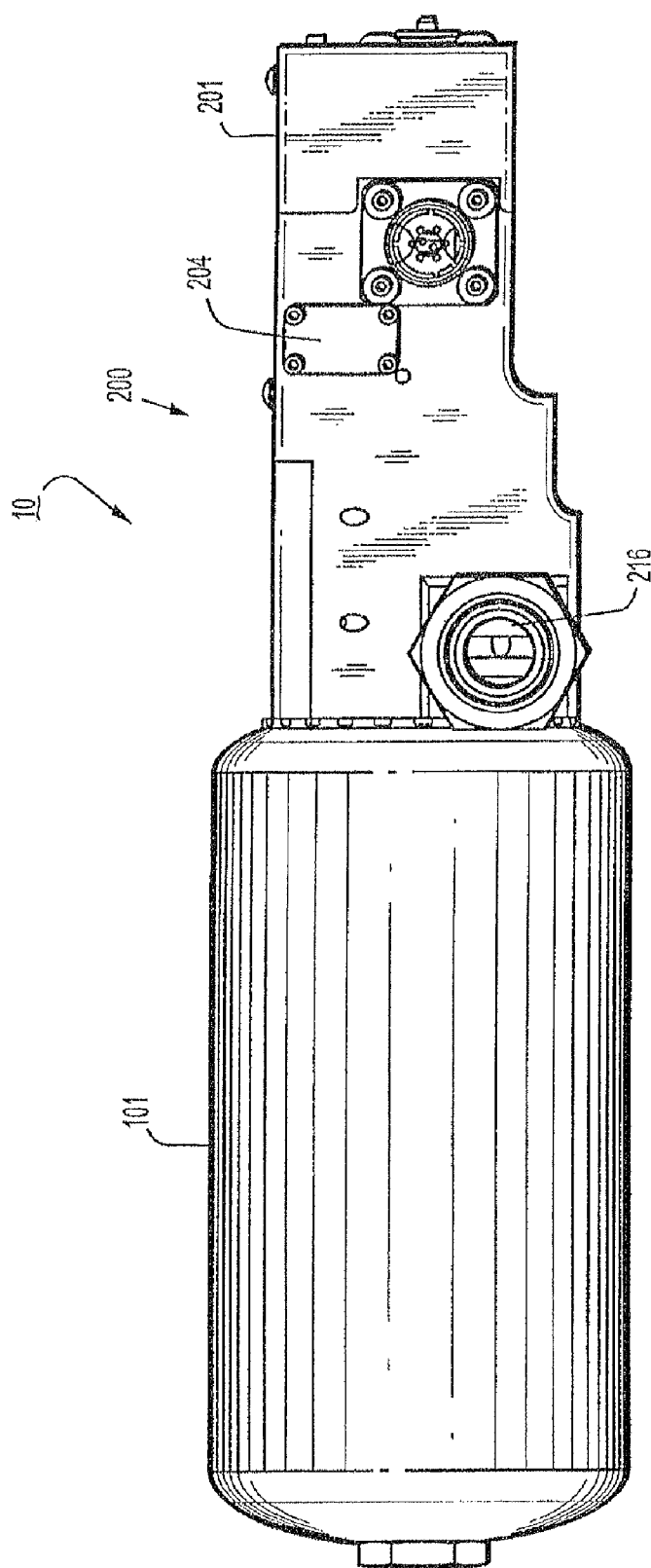
FIG. 4 is a left side view of the gas supply system, according to an embodiment of the present invention.
Figure 5:
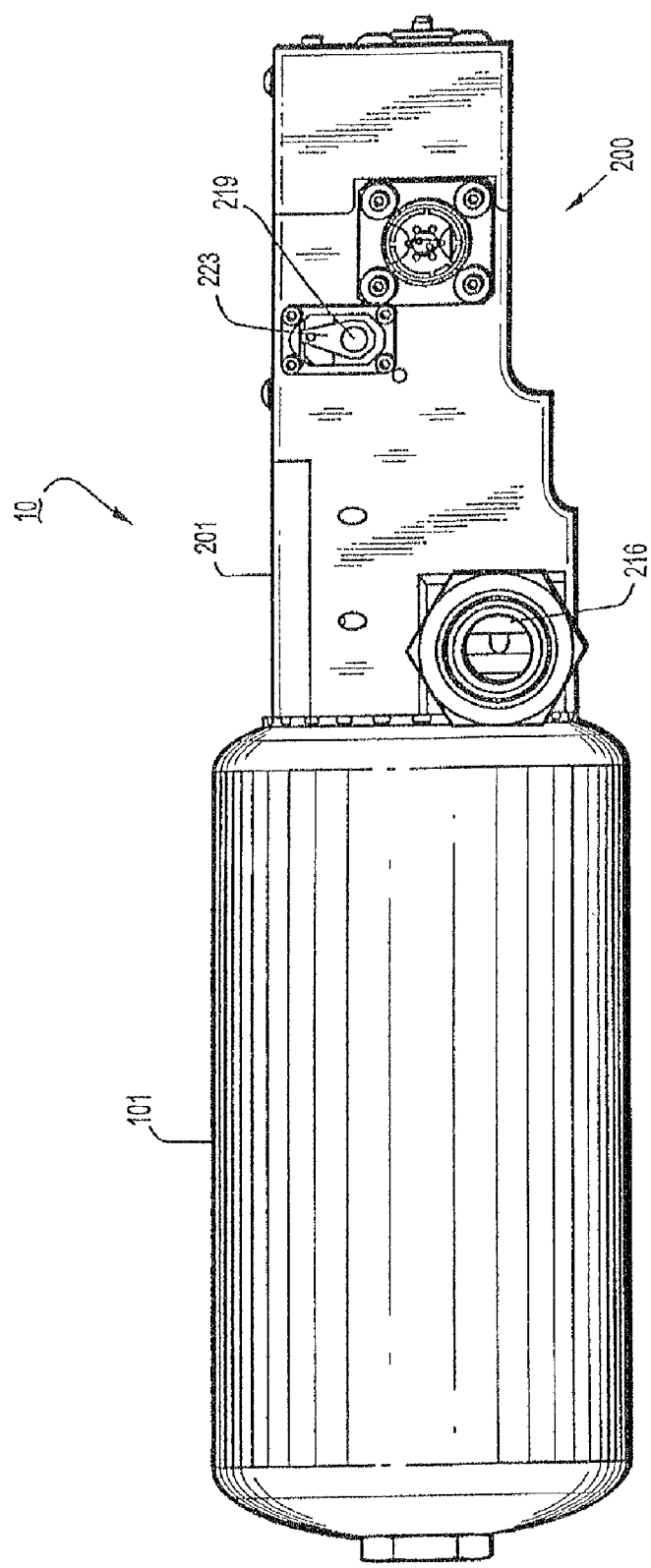
FIG. 5 is a left-side view of the gas supply system with an access panel removed to show a shaft and bell-crank, according to an embodiment of the present invention.
Figure 6:
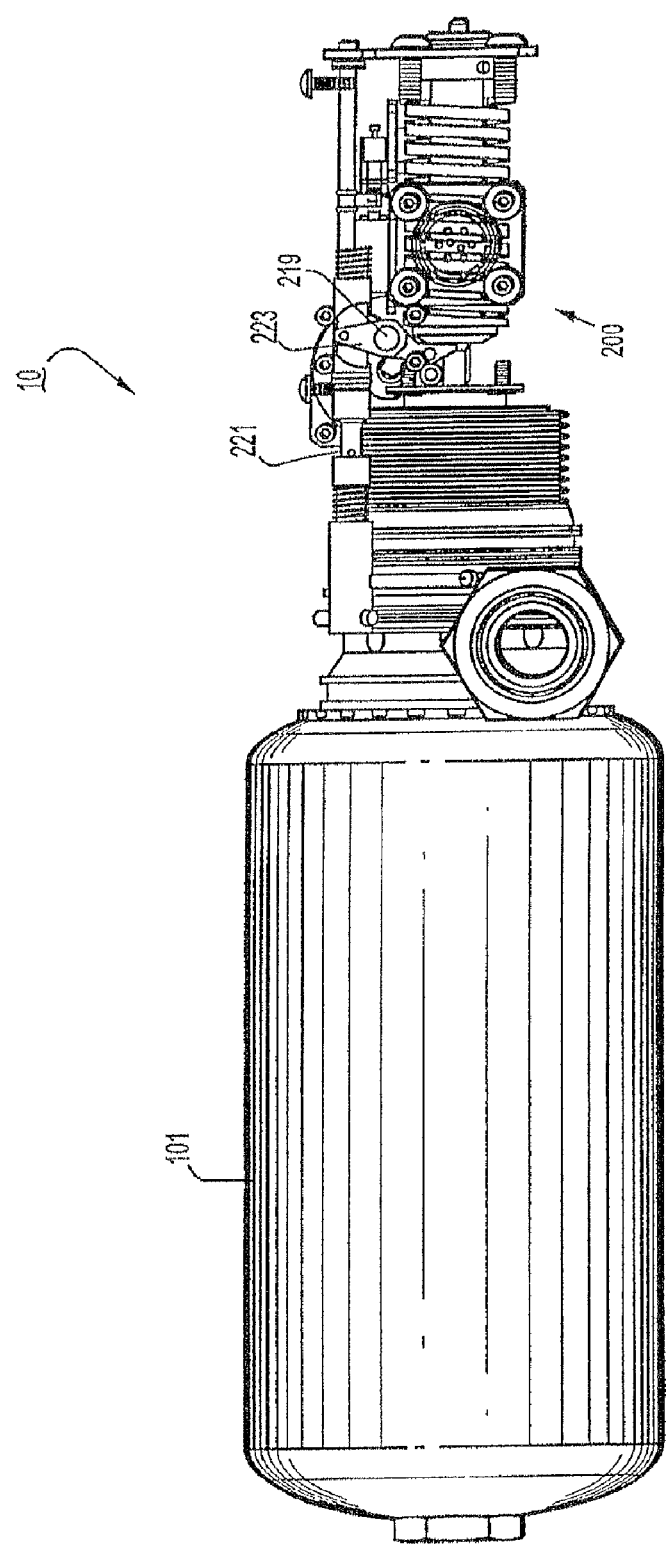
FIG. 6 is a left-side view of the gas supply system with a receiver assembly housing removed to show a sequencing valve, according to an embodiment of the present invention.
Figure 7:
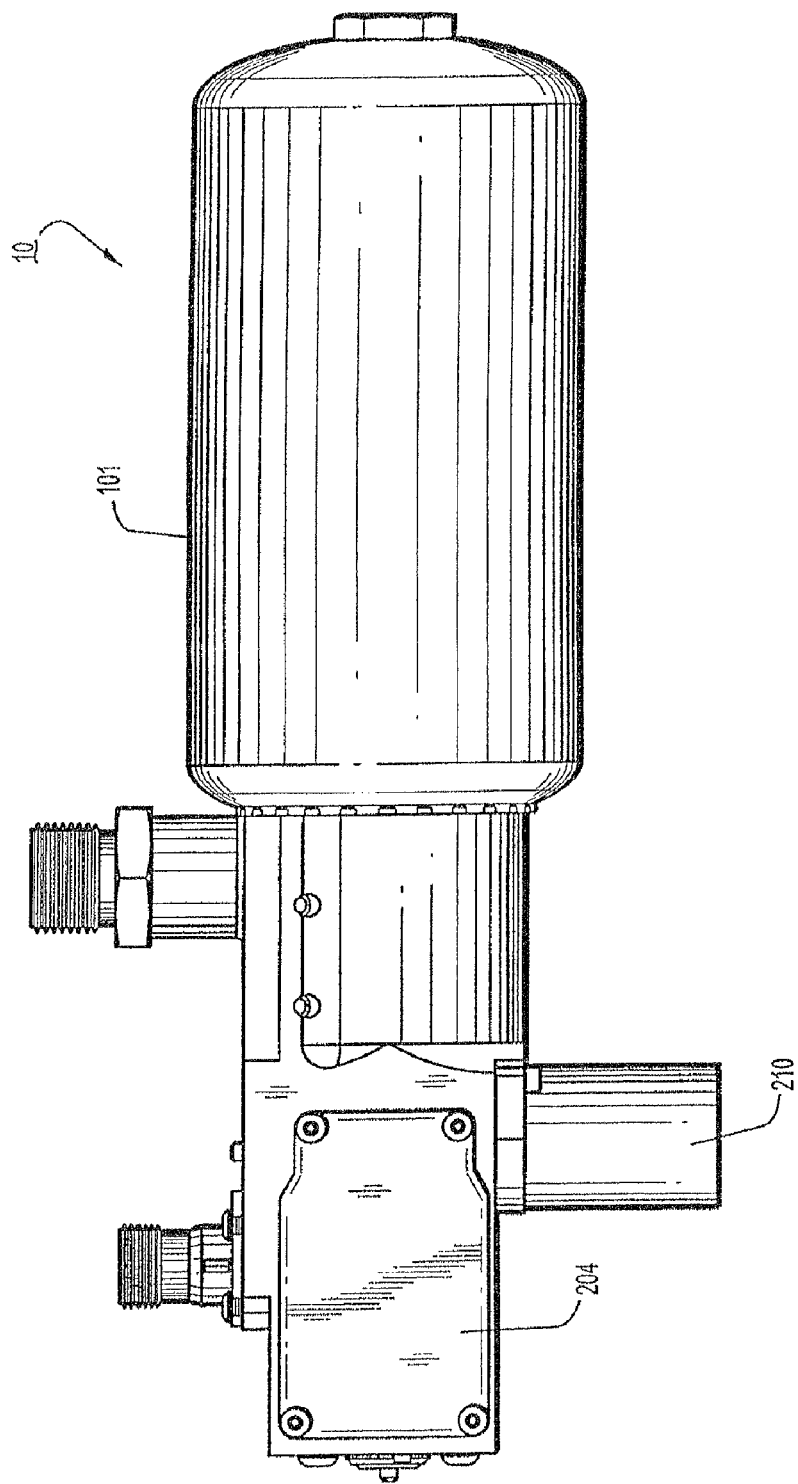
FIG. 7 is a top view of the gas supply system, according to an embodiment of the present invention.
Figure 8:
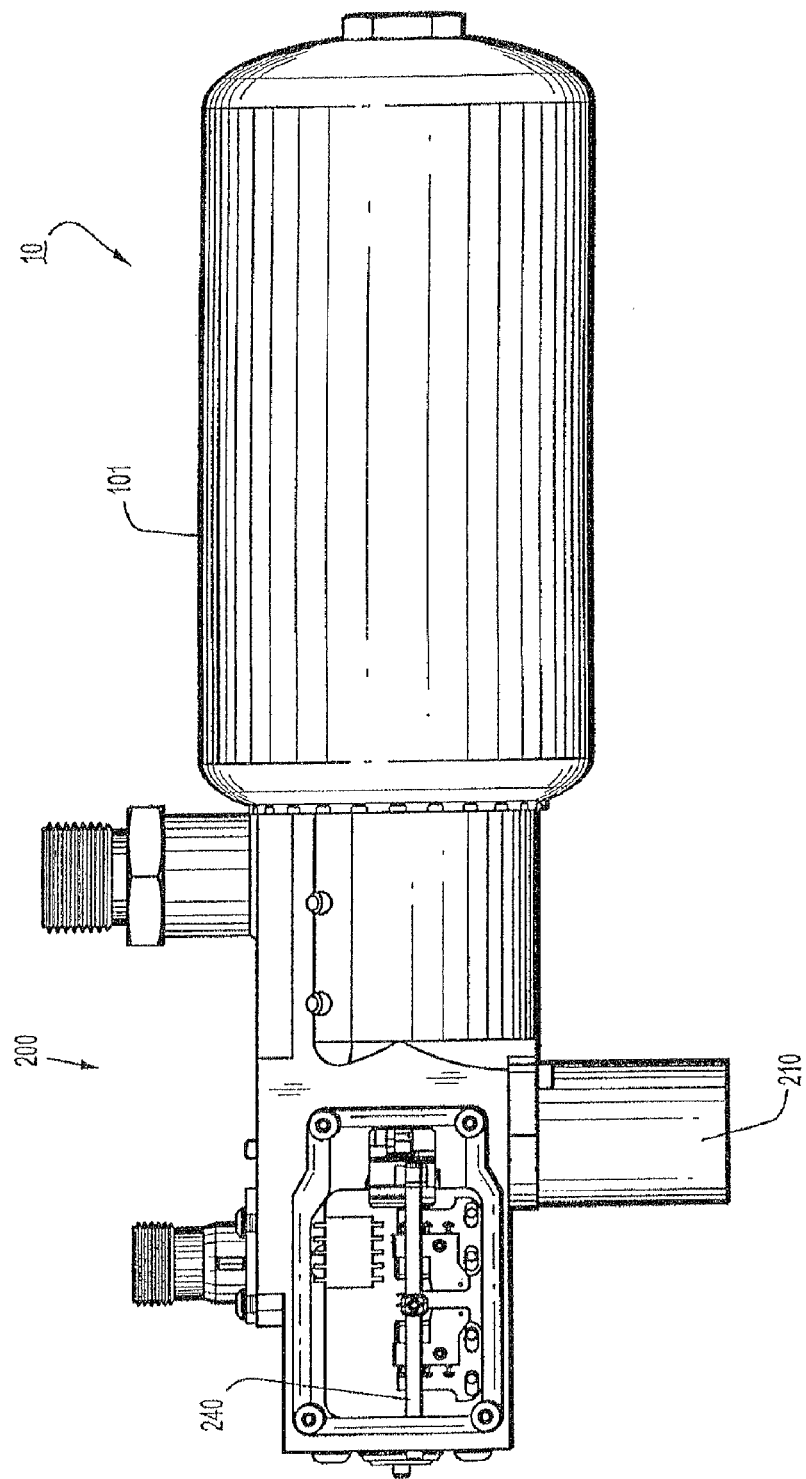
FIG. 8 is a top view of the gas supply system with an access panel removed to show a switch actuator rod, according to an embodiment of the present invention.
Figure 9:
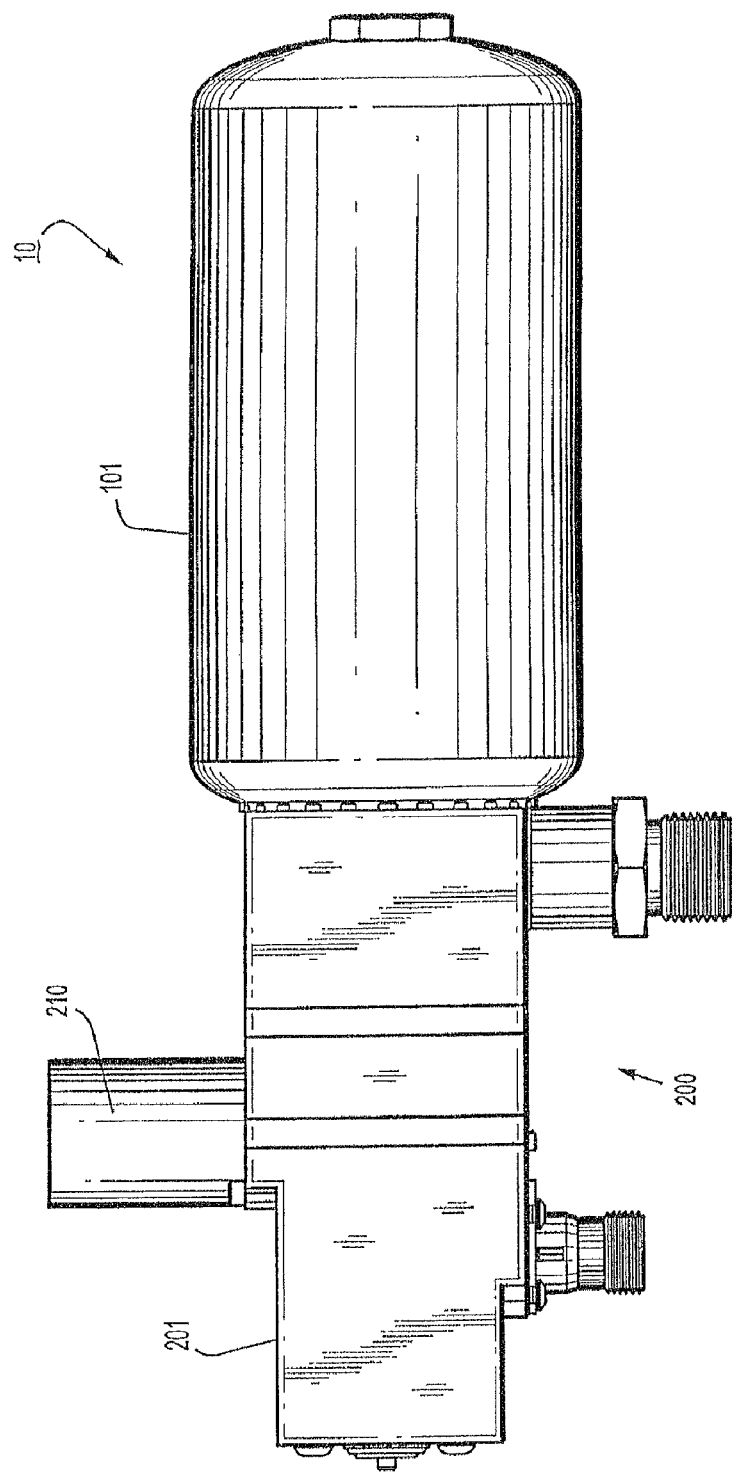
FIG. 9 is a bottom view of the gas supply system, according to an embodiment of the present invention.
Figure 10:
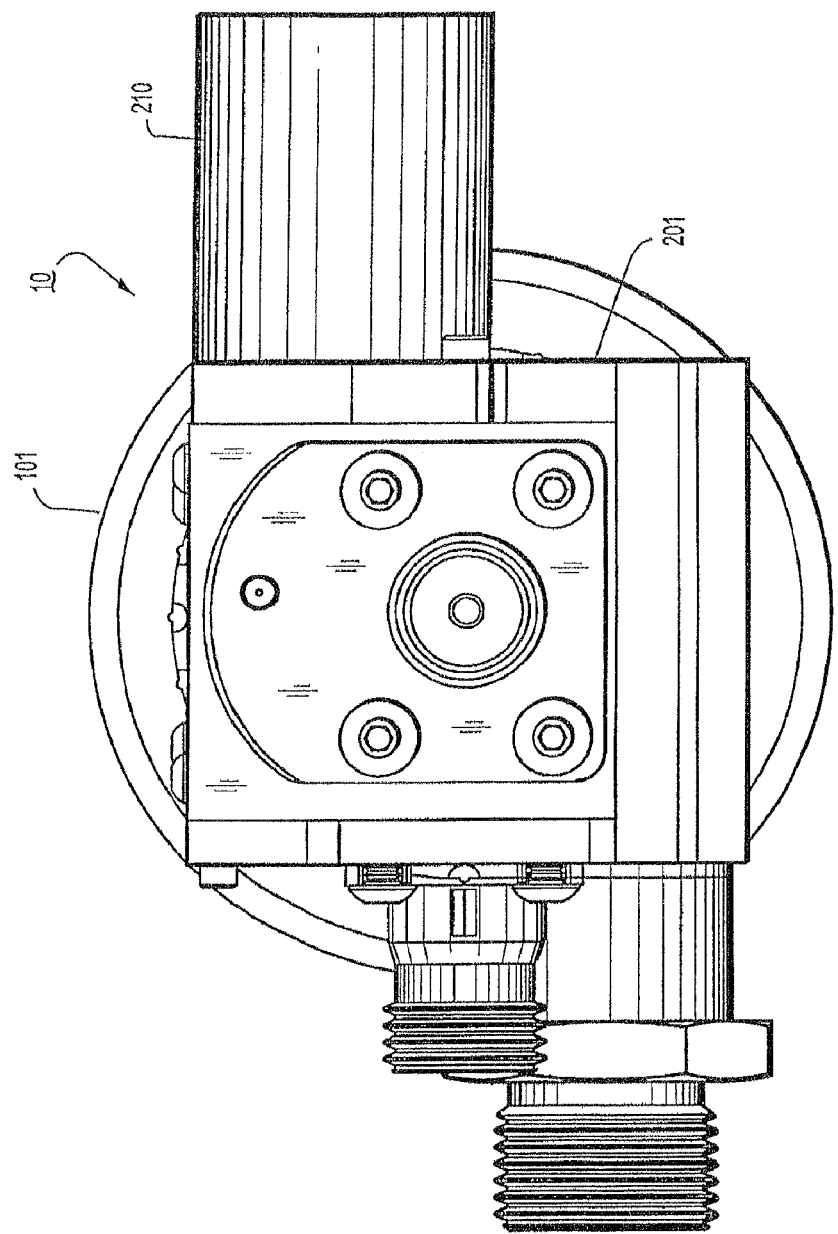
FIG. 10 is a rear view of the gas supply system, according to an embodiment of the present invention.
Figure 11:
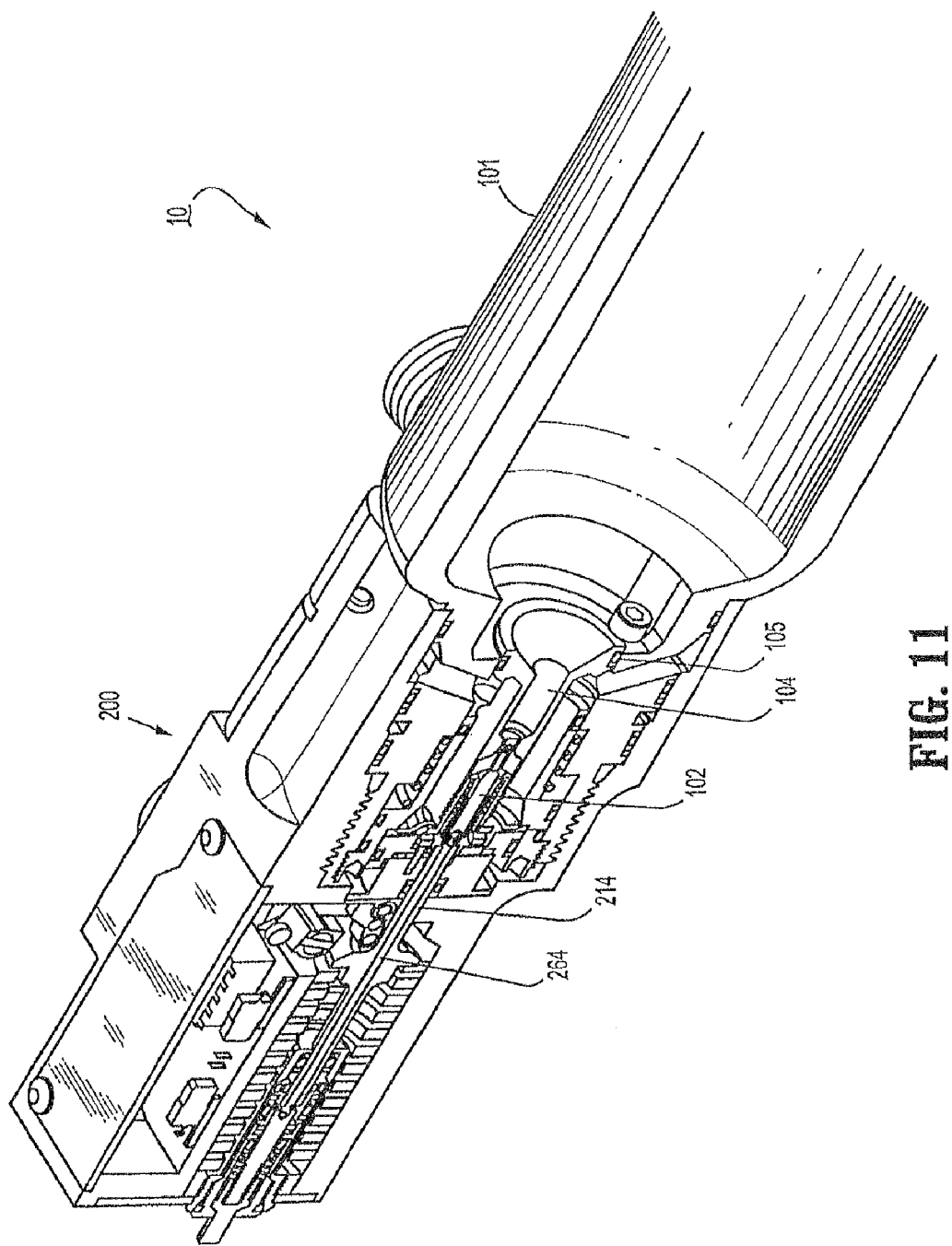
FIG. 11 is a perspective sectional view of the gas supply system prior to actuation, according to an embodiment of the present invention.
Figure 12:
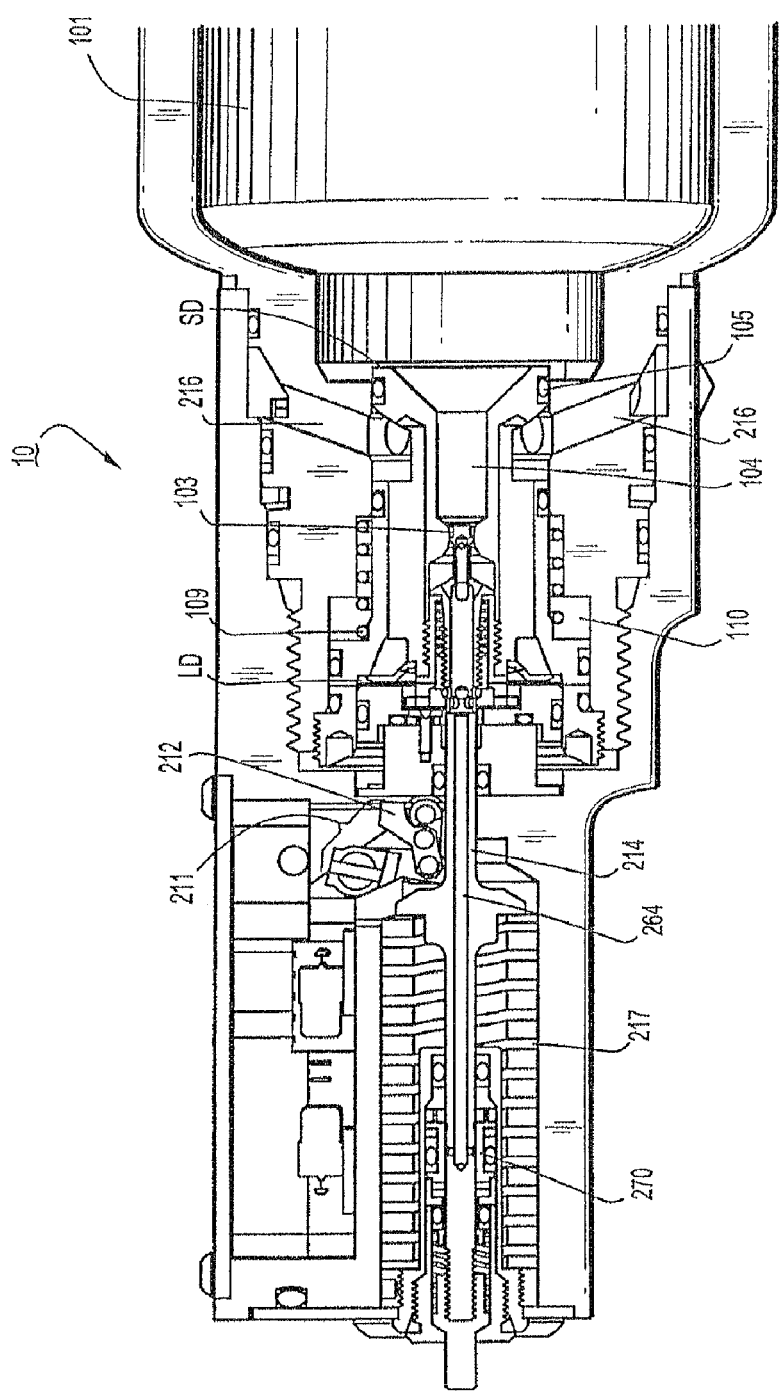
FIG. 12 is a right side sectional view of the gas supply system prior to actuation, according to an embodiment of the present invention.
Figure 13:
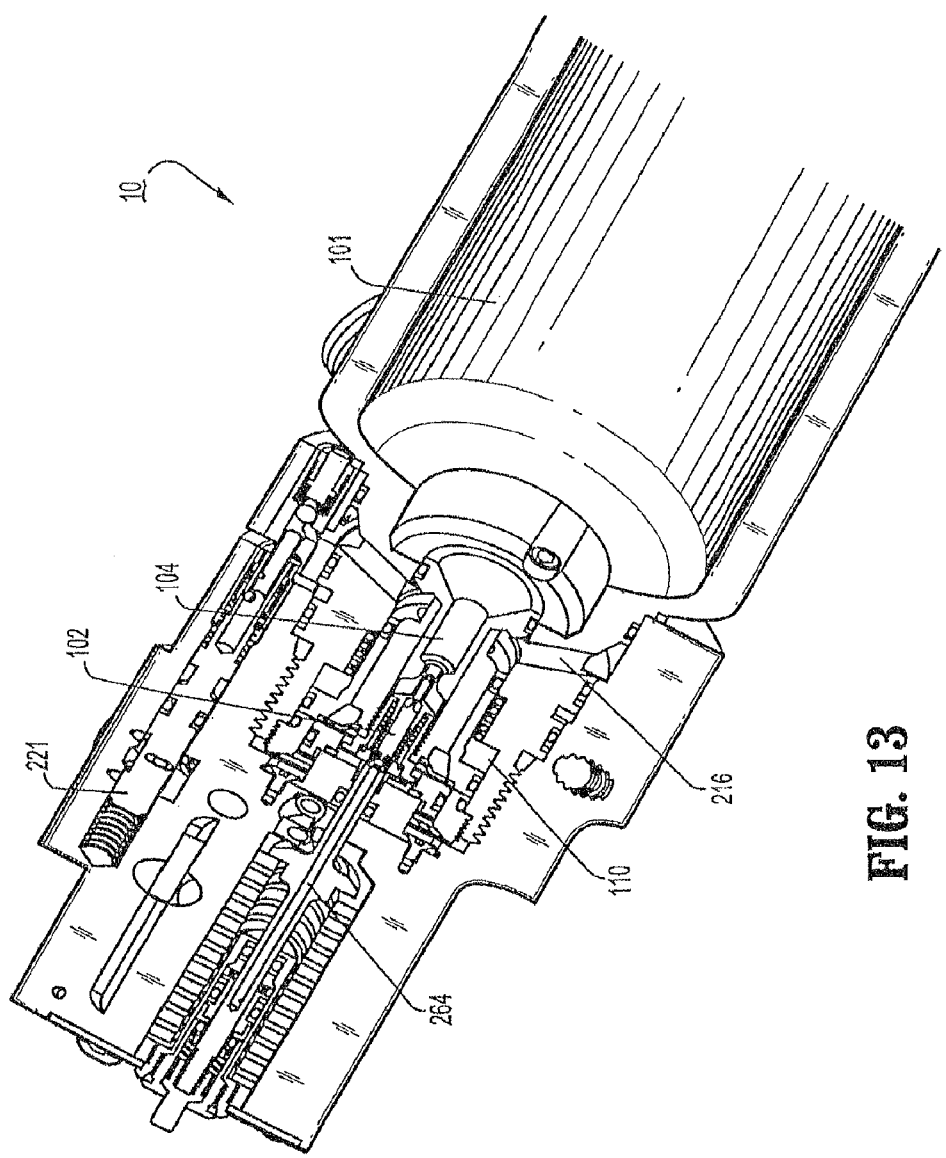
FIG. 13 is a perspective sectional view of the gas supply system prior to actuation and showing a sequencing valve, according to an embodiment of the present invention

Exemplary embodiments of the present invention now will be described more fully hereinafter with reference to the accompanying drawings. This invention may, however, be embodied in many different forms and should not be construed as limited to the embodiments set forth herein.

Turning now to FIGS. 1-18, a gas supply system 10 is shown. The gas supply system includes a gas storage vessel (GSV) 101, and a receiver assembly 200. The GSV 101 is replaceable and is configured to screw into the receiver assembly via, for example, an MS port thread. A detent mechanism may be employed to prevent the GSV 101 from loosening from the receiver assembly 200.

The GSV 101 can be made of, for example, stainless steel, and may include a pressure gauge. The pressure gauge may include a built in overpressure venting system (not shown) that will prevent explosive bottle failure in case of fire or other causes of dangerously excessive pressure. The venting system may include, for example, a relief valve.

The receiver assembly includes a housing 201, which includes access panels/covers 204. In some of the views, for example, FIGS. 5, 6, and 8, the access panels/covers 204 and/or the housing 201 have been removed to illustrate some of the inner components of the receiver assembly 200.

All receiver assembly components are housed in the housing 201 and protected from environmental contamination by the access covers 204. The receiver assembly 200 provides pneumatic and electrical connections to the aircraft. For example, the electrical connections receive operating power from, provide gas supply system status to, and receive the launch command(s) from, the aircraft weapons control system. A compressor port 218 connects to the output of an on-board compressor (not shown) to optionally perform a recharging operation of the GSV 101. The port 218 may be connected to an internal check valve in the GSV 101. The pneumatic outlet port 216 connects to the pneumatic inlet on the bomb rack or other store supporter, so that the pressurized gas may operate the store ejection mechanisms of the bomb rack.

The interface between the receiver assembly and the GSV 101 assemblies provides connection for individual, isolated passages between the GSV 101 and the receiver assembly 200. A first passage connects, when actuated, the gas stored in the GSV 101 to the receiver assembly 200 and ultimately, the outlet port 216. A second passage connects the control chamber 110 in the GSV 101 to a sequencing valve 220 (discussed below). A third passage connects the compressor port 218 to a GSV inlet check valve.

In a normal pre-flight check of the system, the pressure gauge on the GSV 101 is checked to insure that the GSV 101 has the specified pressure to operate the bomb rack. If not yet installed, the GSV 101 is screwed into the receiver assembly mounting thread until it is fully seated (e.g., hand tight). A protruding pin may be positioned on the back of the receiver assembly 200, allowing a visual and/or tactile status check without powering up the aircraft. For example, if a valve actuating system of the receiver assembly is properly armed, the pin protrudes from the housing 201 of the receiver assembly. Conversely, if the valve actuating system of the receiver assembly is not properly armed, the pin will not protrude, signaling that the GSV 101 may have been depleted. The receiver assembly 200 can be re-armed manually and the GSV 101 can be replaced or re-charged.

Gas is stored in the GSV 101, and is released upon actuation of a gas release pilot poppet 102 and a main poppet 104. Low leakage seals 103, 105 and 108 allow long term storage of gas in the charged vessel 101. For example, the GSV 101 may have a 10 year storage life without significant loss of gas pressure. The pilot poppet 102 includes the seal 103 and a back-up ring (not visible in the drawings) positioned in O-ring groove 103g, and the main poppet 104 includes seal 105 and a back-up ring 105b positioned in O-ring groove 105g. The seals and back-up rings, which are made of, for example, rubber, provide a very low leakage seal and plug an orifice in the main valve poppet 104. Since the seals 103 and 105 are pushed into the pressure source and held in the O-ring grooves by the pressurized gas leaving the GSV 101, the seals 103 and 105 are able to perform a dual function of sealing the GSV 101, while also acting as a poppet seats.

Seal 108 is low leakage poppet style check valve seal. Like the seals 103 and 105, the seal 108 is pushed into a pressure source (e.g., pressurized gas coming from a compressor) and held in an O-ring groove by the pressurized gas leaving the pressure source. Like the seals 103 and 105, the seal 108 is able to perform a dual function of sealing, and also acting as a poppet seat. The check valve poppet seal 108 is formed in a conduit 237, which leads to a passage 238 that connects to compressor port 218.

Referring, for example, to FIGS. 11-14, prior to actuation, a plunger 214, which is biased by a spring 217, is held in place by a trigger sear linkage 211. At this point, a pilot valve poppet 102 and a main valve poppet 104 are closed so that no gas is released from the GSV 101.

A command, for example, a bomb drop command from inside the aircraft, is relayed to a solenoid 210, which actuates the trigger sear linkage 211 to release the spring loaded plunger 214. The plunger 214 is held in the retracted position by a trigger linkage 212 that is in turn held in position by a sear linkage and a sear pin that is movable along its axis. The sear pin is attached to the triggering solenoid 210, but is held in the extended position by a solenoid return spring. This trigger sear linkage 211 holds the plunger 214 retracted until the solenoid 210 is energized.

Upon the launch command, the solenoid 210 is energized, the sear pin retracts, compressing the solenoid return spring, allowing the sear linkage to fold and the plunger 214 to extend, contacting the pilot poppet 102, compressing the pilot poppet return spring 107, and forcing the GSV main poppet 104 forward into the storage vessel 101.

A switch actuator rod 240 is connected to the top of the sear link. The switch actuator rod 240 is part of the electrical control and monitoring system and actuates an electrical switch at each end of the plunger movement. As the plunger 214 begins its extension, the now rotating sear link pushes the switch actuator rod 240, activating a first switch, which energizes a small relay, which in turn removes electrical power from the triggering solenoid 210. The solenoid 210, now de-energized allows the solenoid return spring to extend the sear pin to the side of the sear linkage. Since the sear has already been released, the sear pin simply rests against the side of the sear linkage until the sear linkage and plunger retract.

The spring loaded plunger 214 presses pilot valve 102 inward toward the stored gas pressure, releasing a small amount of high pressure gas into chamber A, which is a closed cavity. The increased pressure in chamber A, which is positioned behind the main valve poppet 104, then acts on the main poppet 104 to push the main poppet 104 inward into the GSV 101 toward the pressure. As a result, the main valve opens, and pressurized gas is released to discharge port 216. From discharge port/outlet fitting 216, the gas travels to the store ejection mechanism to release the store.

Standard O-ring seals 103 & 105 can be used for low leakage valve design. Because the main valve poppet 104 is pushed into the pressure stream from the GSV 101, the O-rings are not forced off, and instead, are held in place by the pressurized gas. In other words, by pushing the poppets 102 and 104 into the pressure source 101, the soft rubber seals 103 and 105 are not stripped from the poppets by the pressure. Use of a soft rubber seal 103/105 allows very low leakage rates, which provides very long storage life, while still allowing quick release of the gas.

According to an embodiment, the main valve poppet 104 has three sets of very low leakage seals with back-up rings, made from, for example, rubber. The main poppet 104 plugs, with a first set of seals 105 and back-up rings 105b, a much larger orifice relative to the pilot valve port directly in the storage vessel 101. A second set of seals 130 and back-up rings 130b with the same diameter as the first set prevents leakage of released gas to the control chamber 110 of the main poppet 104. On the other end of the main valve poppet 104 are a piston and the third set of seals 140 and back-up rings 140b that is about 25% larger in diameter than the first two sets. The main and pilot poppet assembly is retained against vessel pressure by a nut.

The main valve poppet 104 has a stepped diameter. A smaller diameter end SD seals the GSV 101 and a larger diameter end LD seals against chamber A. According to an embodiment, the larger end is about 25% than the end where the seals 105 are located. However, it is to be understood that the ratio of the larger diameter end LD to the smaller diameter end SD may vary depending on different applications, so long as the difference in size in large enough to overcome seal friction and spring force, and push the poppet into the gas source.

More specifically, the gas released by the pilot valve 102 gathers in chamber A and is trapped against this larger diameter of the main valve poppet 104. The larger area due to the larger diameter overcomes the force of the stored gas and the main poppet spring, which can also be used to bias the poppet 104 closed, and forces the poppet 104 inward into the GSV 101. The difference in diameter causes the poppet 104 to move very quickly. For example, approximately 20 milliseconds (ms) or less than 20 ms elapse from actuation of plunger 214 to the high volume release of the stored gas into the outlet fitting 216. The 20 ms period is fast enough so that any increase in the time to more than 20 ms, from plunger actuation to release of stored gas due to environmental conditions, is inconsequential to the overall performance of the system and resulting store ejection.

With the pilot poppet 102 depressed by the plunger 214, high pressure gas starts escaping from the GSV 101 and into chamber A. Gas pressure quickly rises in chamber A and begins acting upon the large diameter end LD of the main valve poppet 104. Since there is a large difference in the area of the large diameter end (piston end) of the main valve poppet 104 versus the end SD plugging the outlet of the GSV 101, the main poppet 104 is forced into the vessel 101, compressing the main valve spring 109, and opening the main valve piston ports to the stored gas. As the main poppet 104 begins to open, the main poppet seal 105 moves off the mating surface of the GSV 101. High pressure gas from the GSV 101 travels down connecting ports in the main poppet 104, opening an accelerator check valve, and instantaneously filling a cavity connected to discharge port 216. At this point, the main poppet 104 quickly travels inward into the GSV 101 to its stop, and less than 20 ms or about 20 ms have elapsed.

The larger diameter end LD of main valve poppet 104 is also sealed against the control chamber 110.

Figure 15:
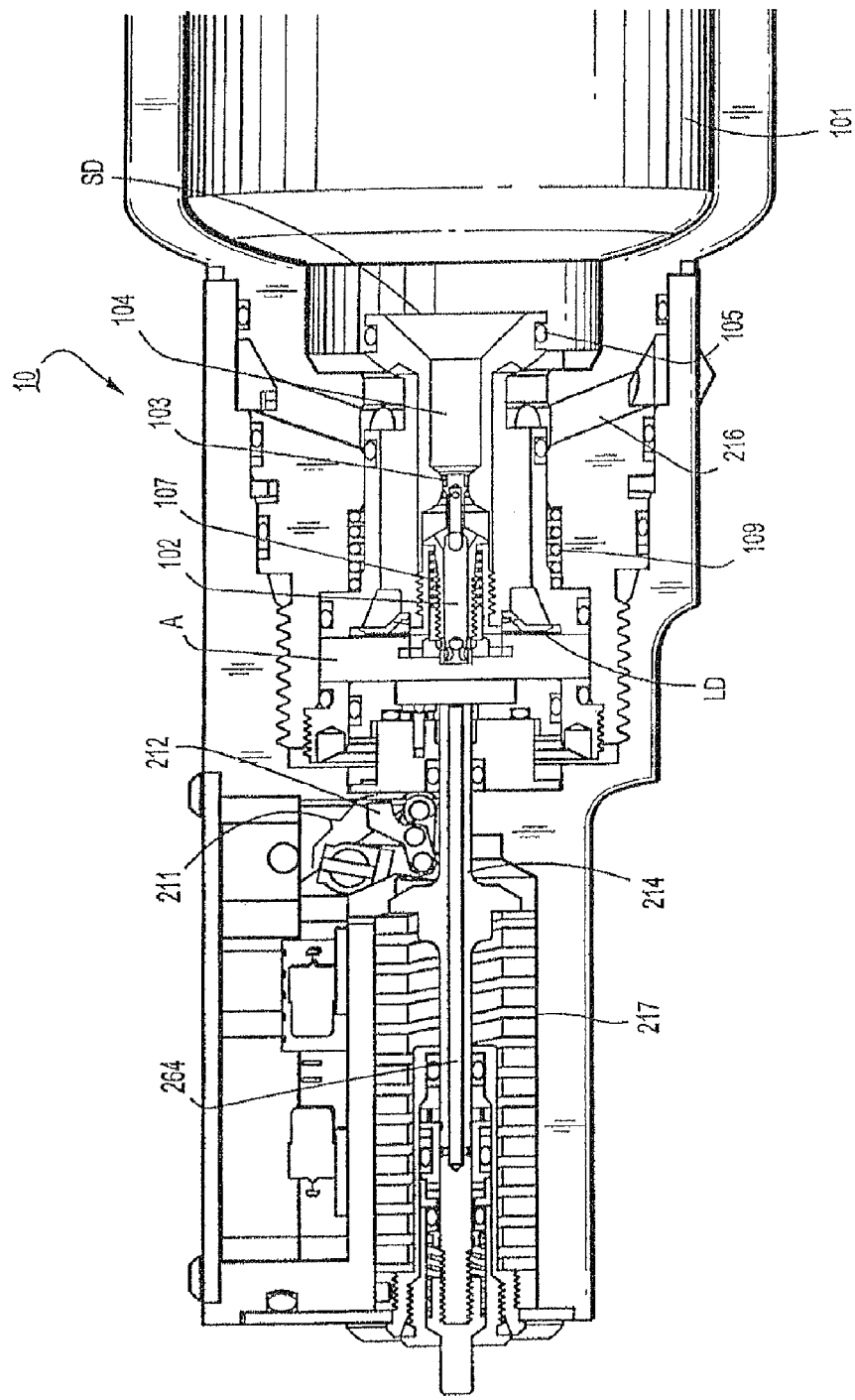
FIG. 15 is a right side sectional view of the gas supply system after actuation, with an open main valve, according to an embodiment of the present invention.
Figure 20:
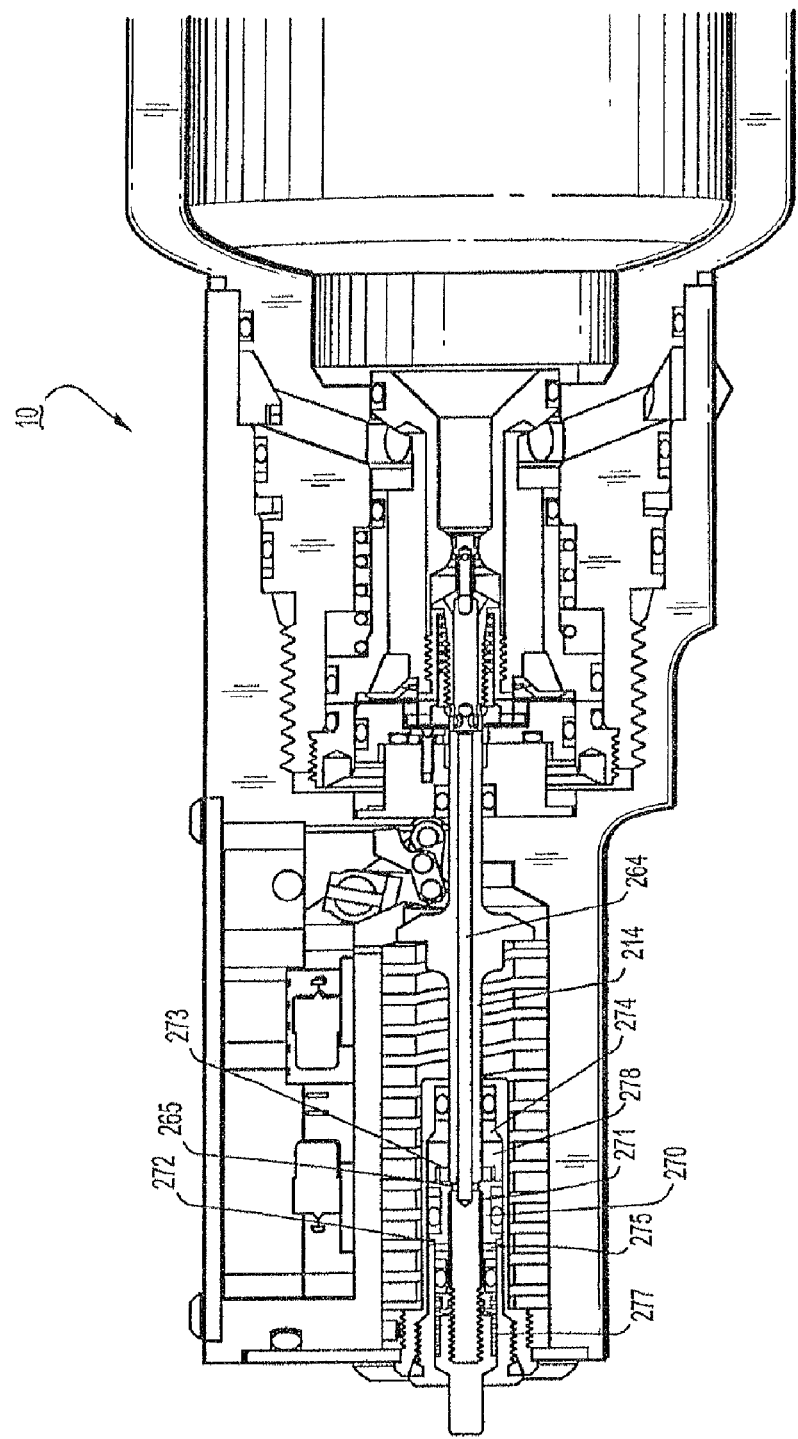
FIG. 20 is a right side sectional view of the gas supply system illustrating a plunger retraction mechanism, according to an embodiment of the present invention.
Figure 21:
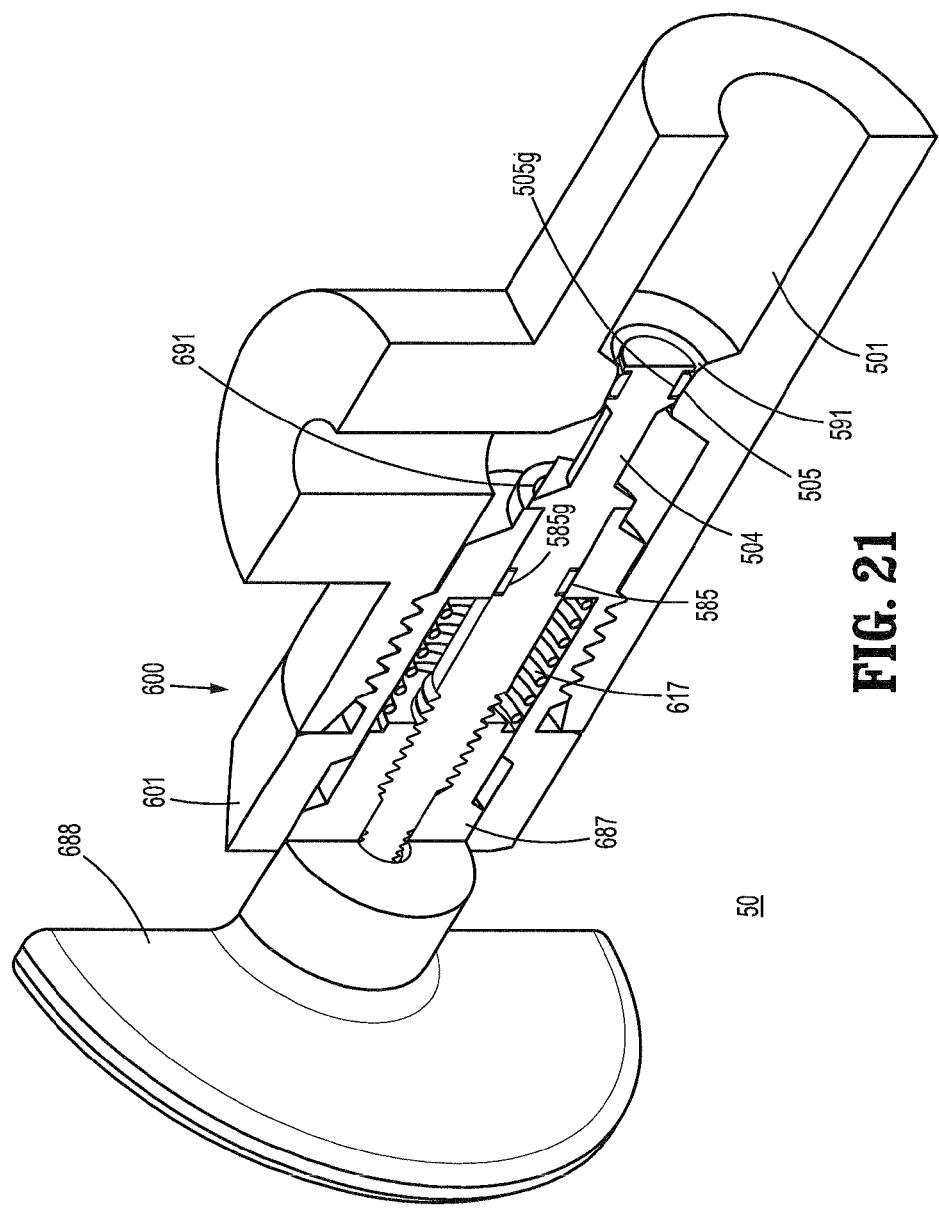
FIG. 21 is a sectional perspective view of a valve system incorporating a push-seal assembly in a closed position, according to an embodiment of the present invention.
Figure 22:
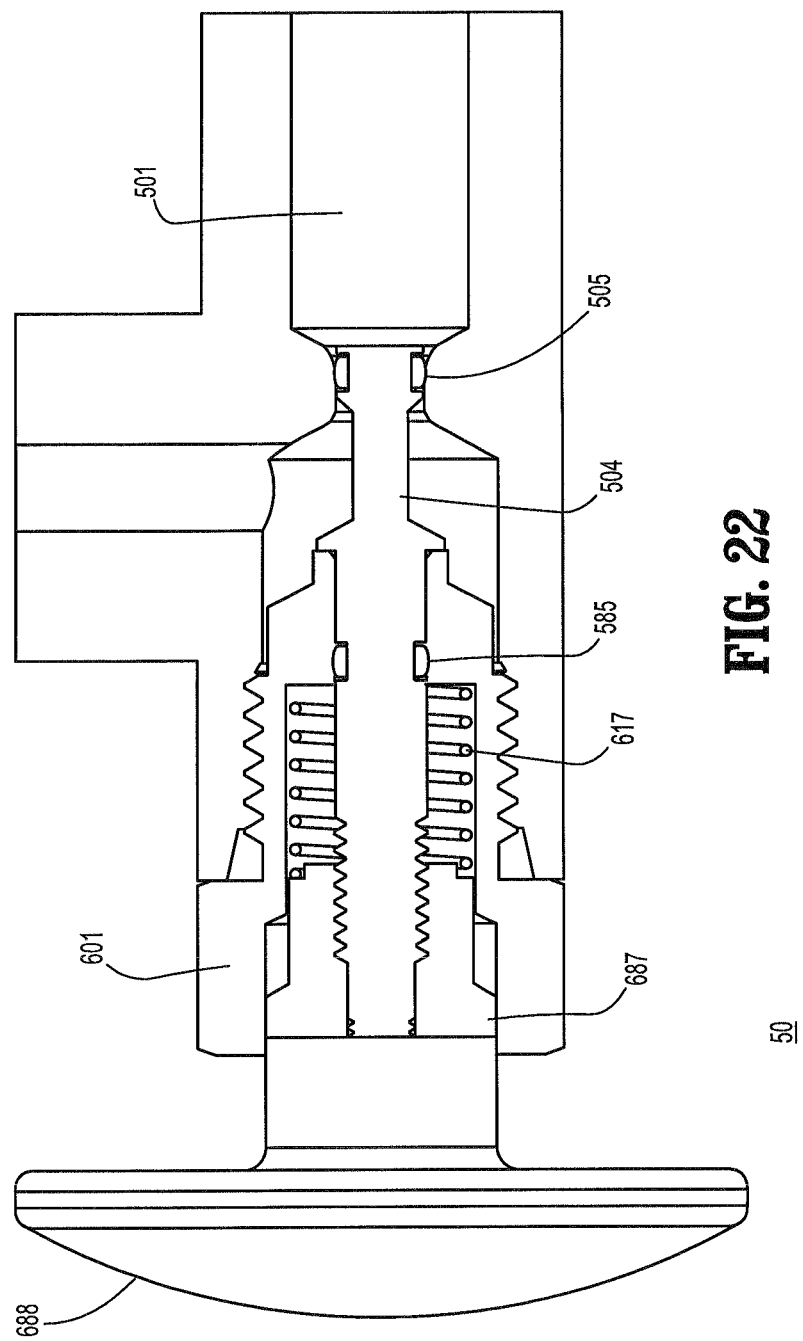
FIG. 22 is a sectional side view of the valve system of FIG. 21 incorporating the push-seal assembly in the closed position, according to an embodiment of the present invention.
Figure 23:
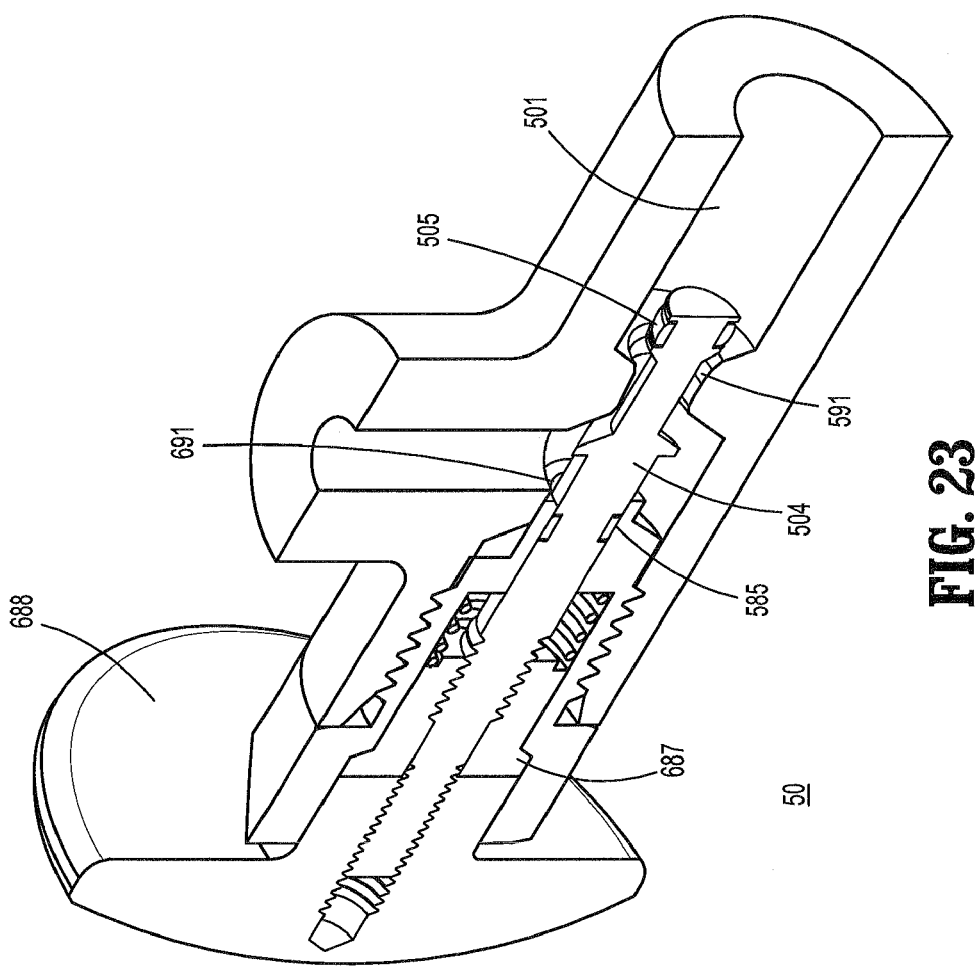
FIG. 23 is a sectional perspective view of a valve system incorporating a push-seal assembly in an open position, according to an embodiment of the present invention.
Figure 24:
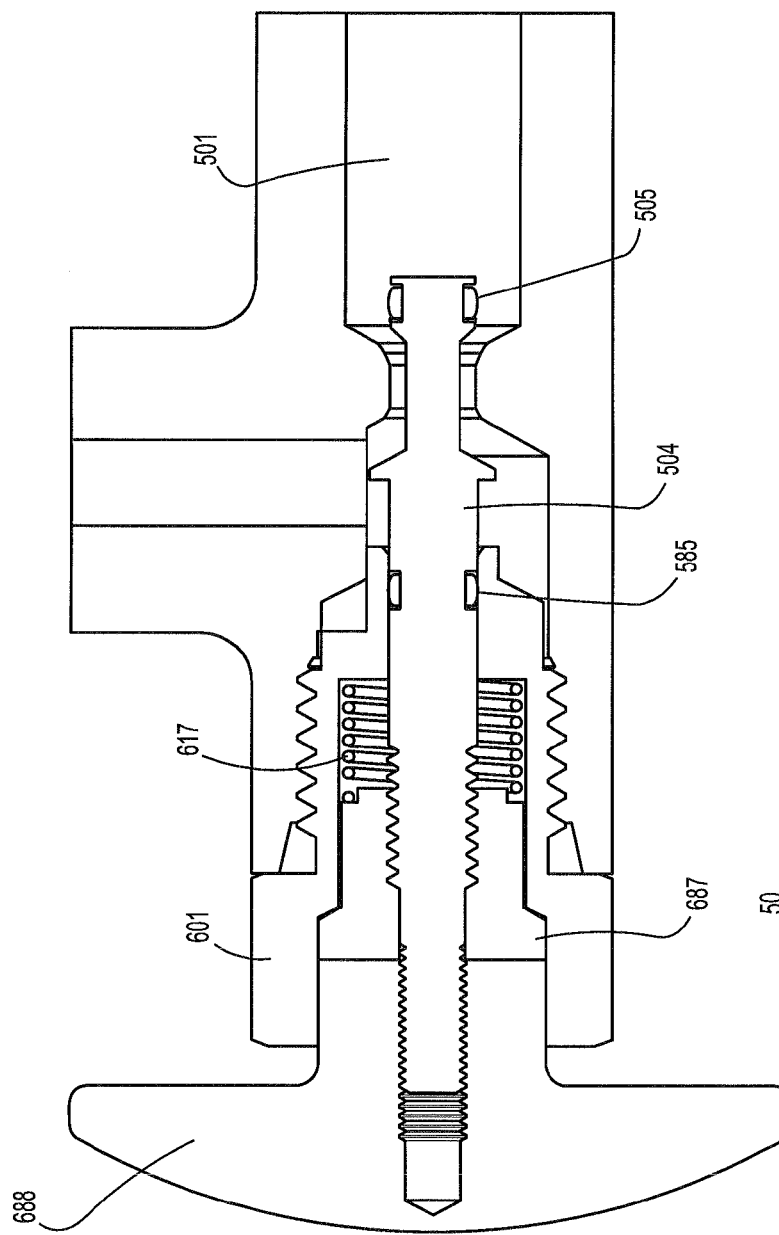
FIG. 24 is a sectional side view of the valve system of FIG. 23 incorporating the push-seal assembly in the open position, according to an embodiment of the present invention.
Figure 25:
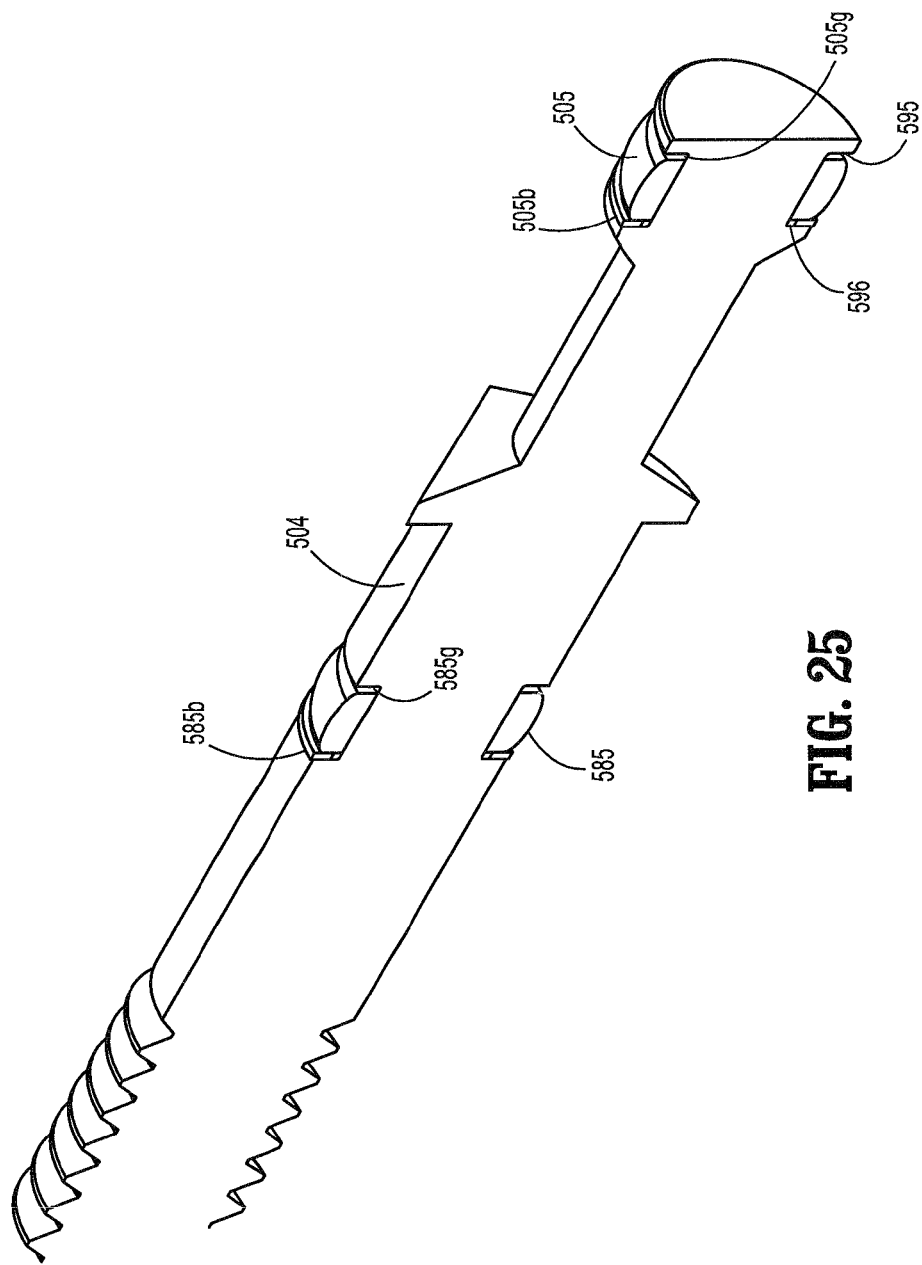
FIG. 25 is an enlarged sectional perspective view of the poppet shown in FIGS. 21-24, according to an embodiment of the present invention.
Figure 26:
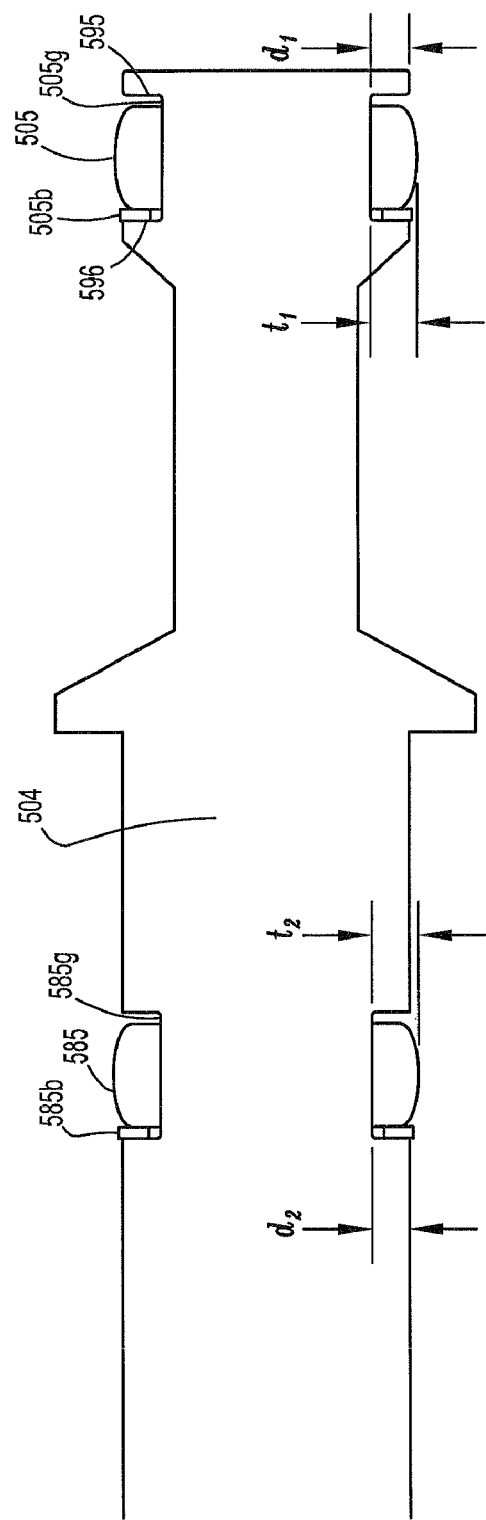
FIG. 26 is an enlarged sectional side view of the poppet shown in FIGS. 21-24, according to an embodiment of the present invention.
Figure 27:
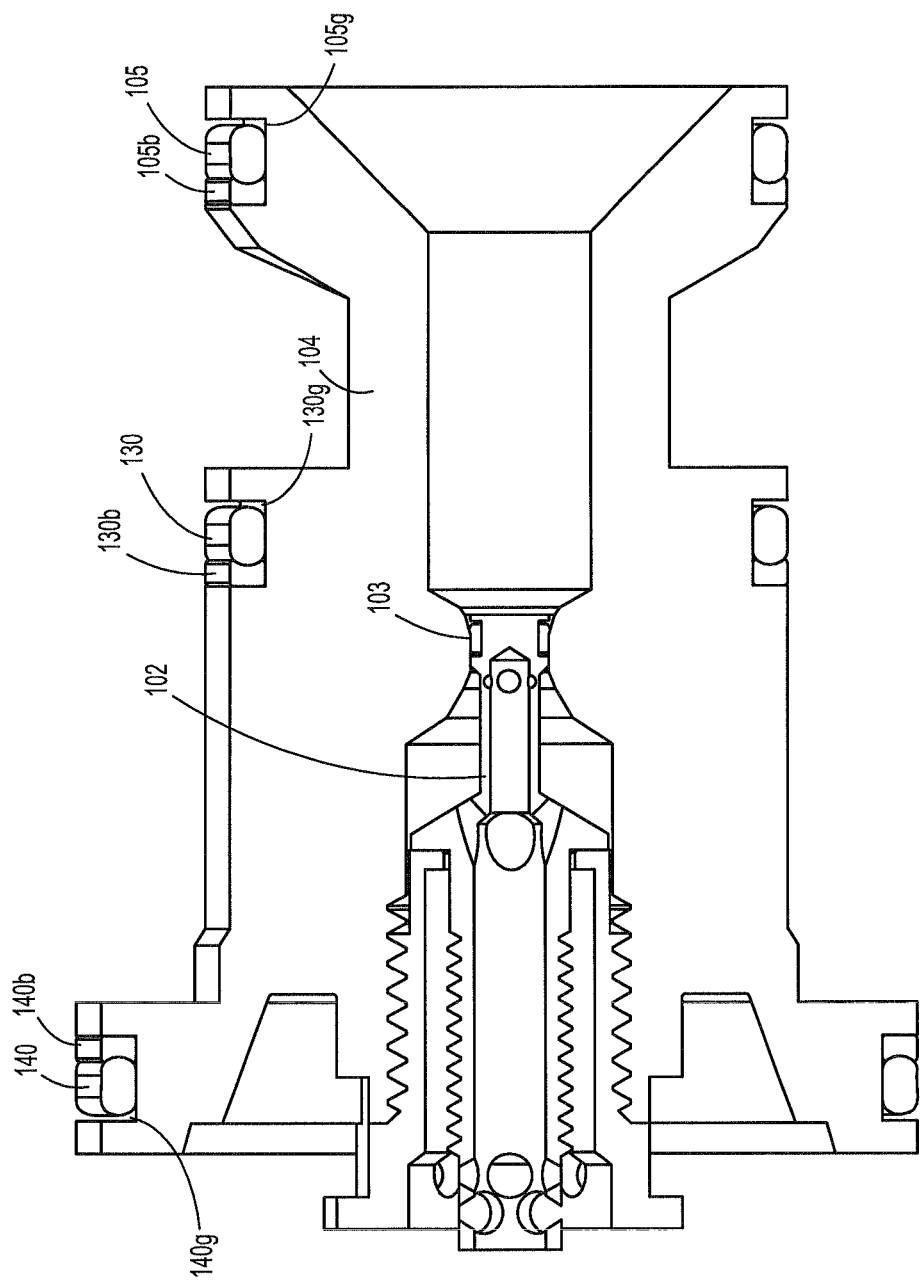
FIG. 27 is an enlarged sectional side view of a pilot valve poppet and a main valve poppet including low leakage seals, according to an embodiment of the present invention.
Figure 28:
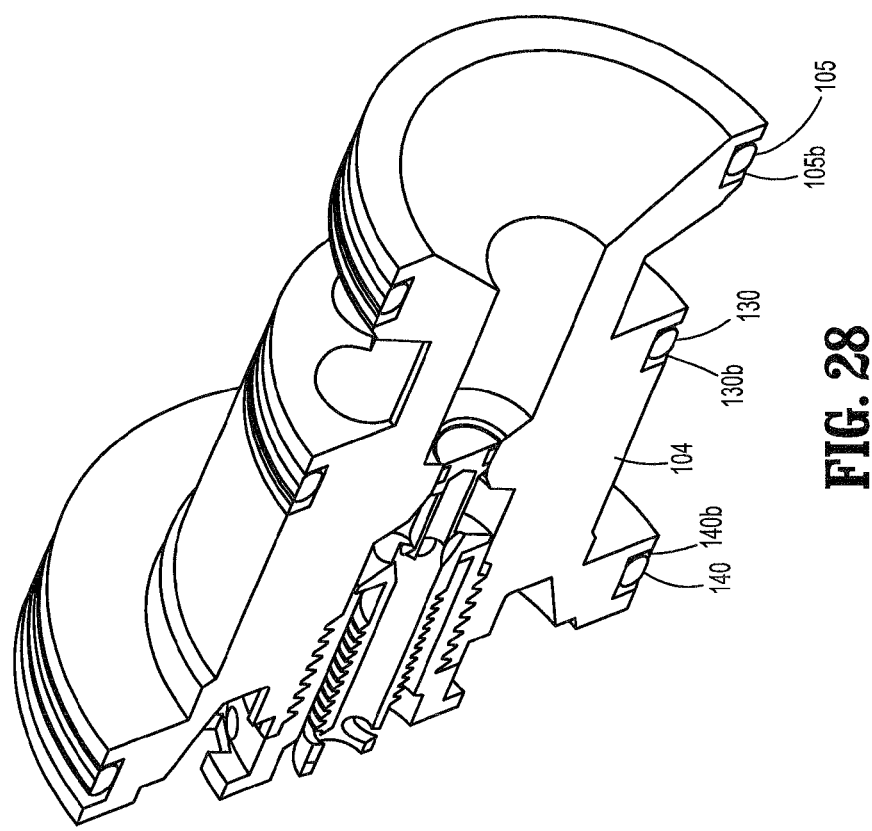
FIG. 28 is an enlarged sectional perspective view of a pilot valve poppet and a main valve poppet including low leakage seals, according to an embodiment of the present invention.
Figure 29:
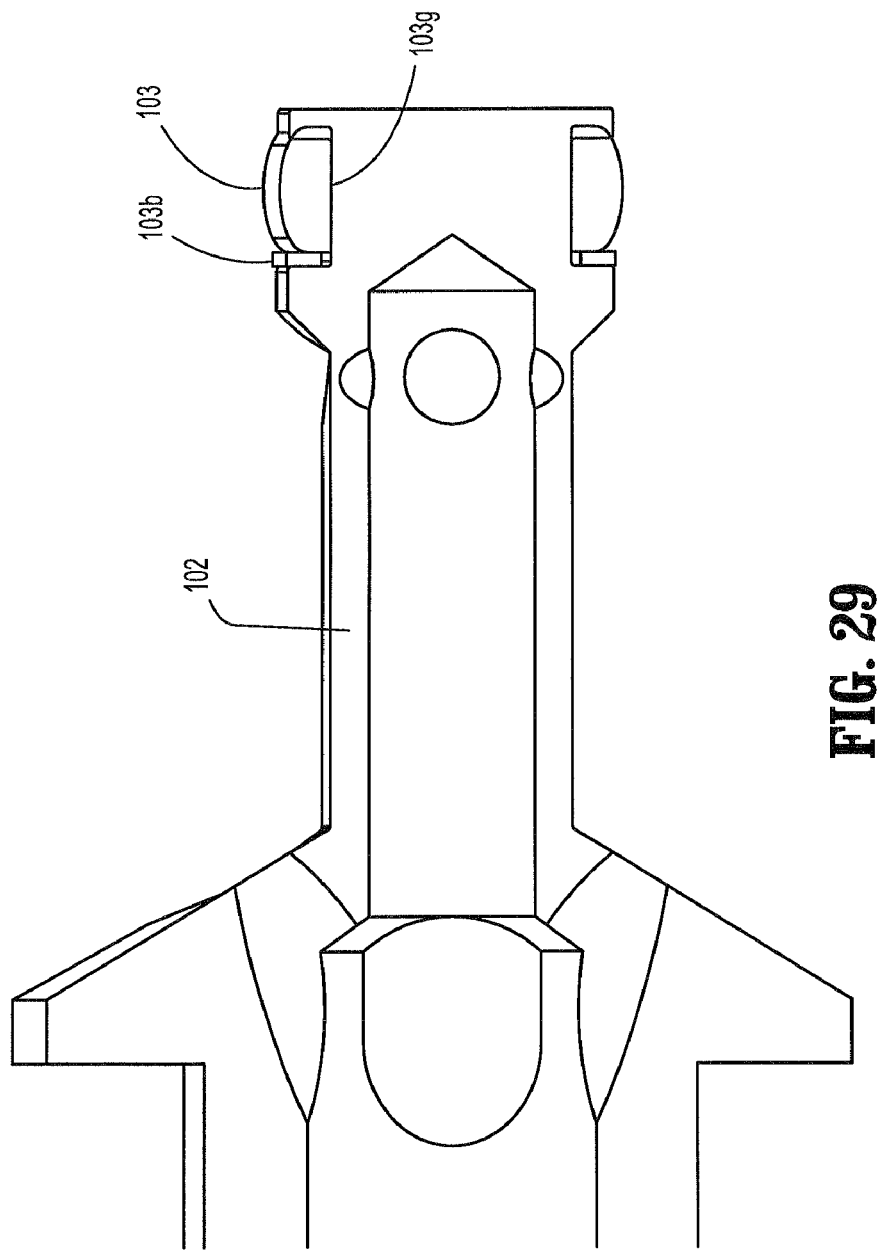
FIG. 29 is an enlarged sectional side view of a pilot valve poppet including a low leakage seal, according to an embodiment of the present invention.
Figure 30:
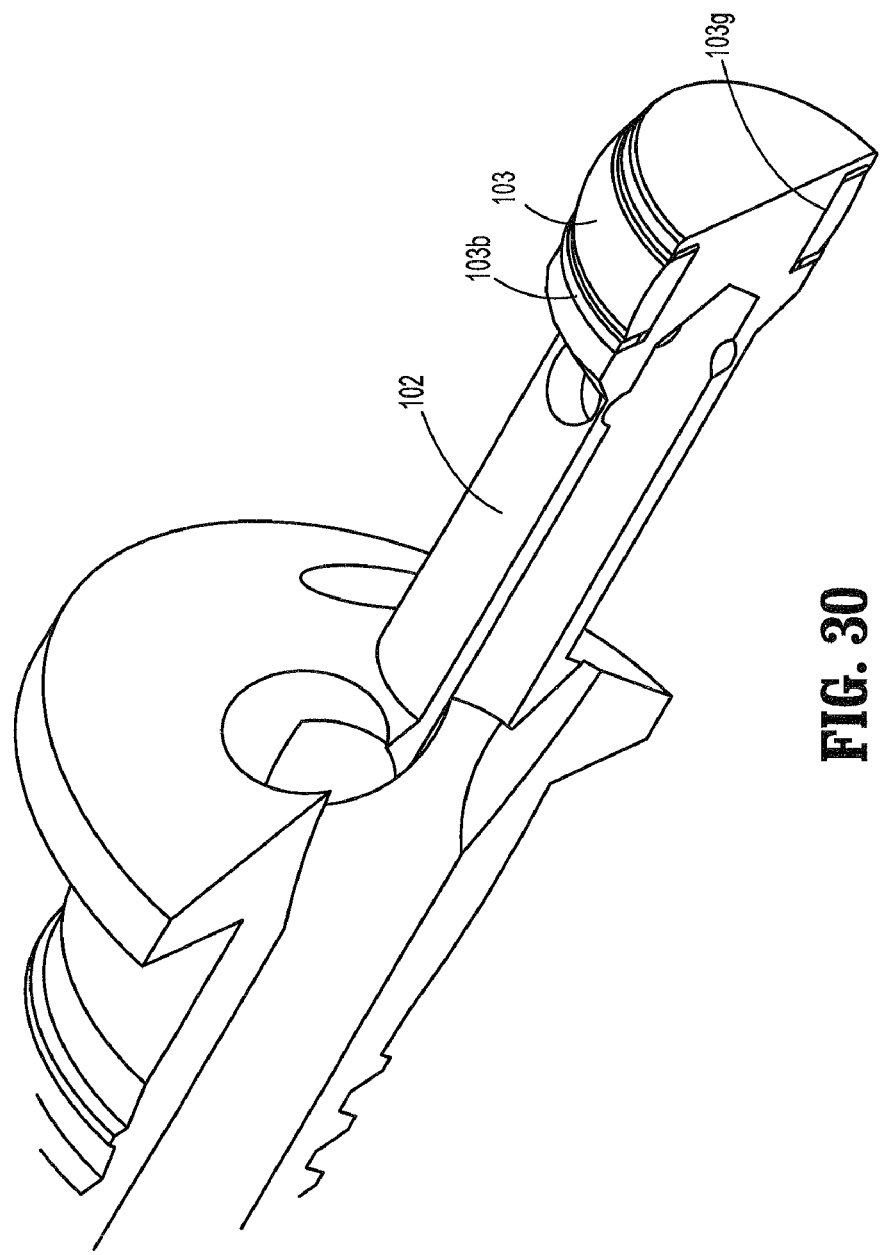
FIG. 30 is an enlarged sectional perspective view of a pilot valve poppet including a low leakage seal, according to an embodiment of the present invention.

Referring to FIG. 15, after actuation, the plunger 214 retracts, and includes a mechanism that uses a small portion of the released gas to re-cock the plunger 214 and reset the trigger sear release linkage 211 for the next release. More specifically, after actuation, the plunger 214 follows the pilot poppet 102 and main poppet 104 as they retract into the GSV 101. A small amount of high pressure gas from the rapidly pressurizing cavity connected to the discharge port is directed to a small conduit 264 down the center of the plunger 214. Referring to FIG. 20, pressurized gas enters a stepped diameter piston/reversing valve interface 270, from the back of the plunger 214, which has an area approximately equal to the frontal area of the plunger 214. More specifically, the gas enters into area 271 of the piston 270 through ports 265, and then into area 272 through ports 275. The area 272 is approximately equal to the frontal area of the plunger 214. The differential area of the piston 270 generates a force (i.e., the force from the gas in area 272) that opposes the force from the gas pressure in the cavity and prevents the gas pressure from prematurely forcing the plunger 214 to the retracted position. As the plunger 214 reaches the end of its travel (the main valve poppet 104 almost fully retracted), piston face 273 on the back of the plunger 214 strikes a stationary surface 274 within the receiver assembly and opens pressure to the other side of the opposing piston 270. When the piston face 273 strikes the surface 274, the momentum of the plunger 214 and spring 277 opens a reversing valve. As a result, gas quickly builds pressure in a reversing volume 278. This pressure reverses and multiplies the force on the plunger 214 and quickly retracts the plunger 214. Since the sear pin was previously extended, the sear linkage is once again in a position to restrain the plunger 214 after the launch sequence is completed and gas pressure in the cavity returns to pre-launch atmospheric pressure.

As a result, the plunger 214 can be automatically re-cocked by using the gas in the system, thereby eliminating the need to manually re-cock the plunger. Since the gas used to re-cock the plunger 214 is not available after the launching cycle is completer, automatic re-cocking occurs during the launch cycle. Accordingly, the system must compensate for the plunger retracting during the gas release cycle. In other words, there must be a mechanism in place to keep the main poppet 104 open after the plunger 214 is retracted and re-cocked.

A sequencing valve 220 is used to keep the main poppet 104 in the open position after the plunger 214 is retracted and re-cocked. More specifically, a shaft 219 attached to the sear linkage connects to a bell-crank 223 set behind an access panel 204 on the side of the receiver housing 201. As the linkage follows the plunger 214 forward, the shaft 219 and bell-crank 223 rotate, moving a sequencing valve rod 221, and compressing a light spring 227.

Figure 14:
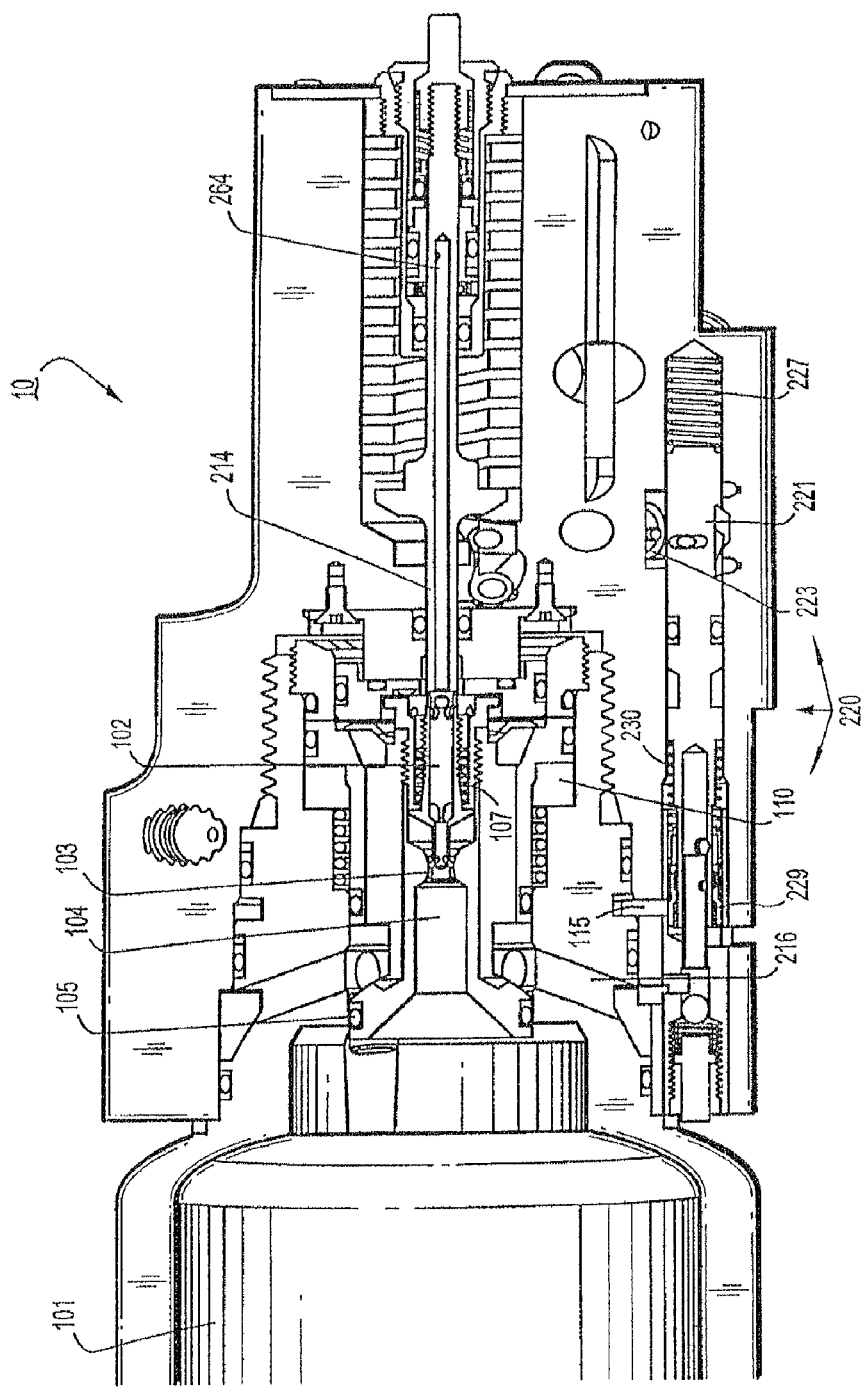
FIG. 14 is a right side sectional view of the gas supply system prior to actuation and showing a sequencing valve, according to an embodiment of the present invention.

For example, referring to FIG. 14, in the pre-actuation position, the sequencing valve rod 221 is in the extended positioned (to the left in the drawing). A sliding valve shroud 229 covers the connecting port 115 to the control chamber 110. At this point, the pilot and main poppets 102, 104 are closed, and the gas in the discharge port 216 is at atmospheric pressure.

Figure 16:
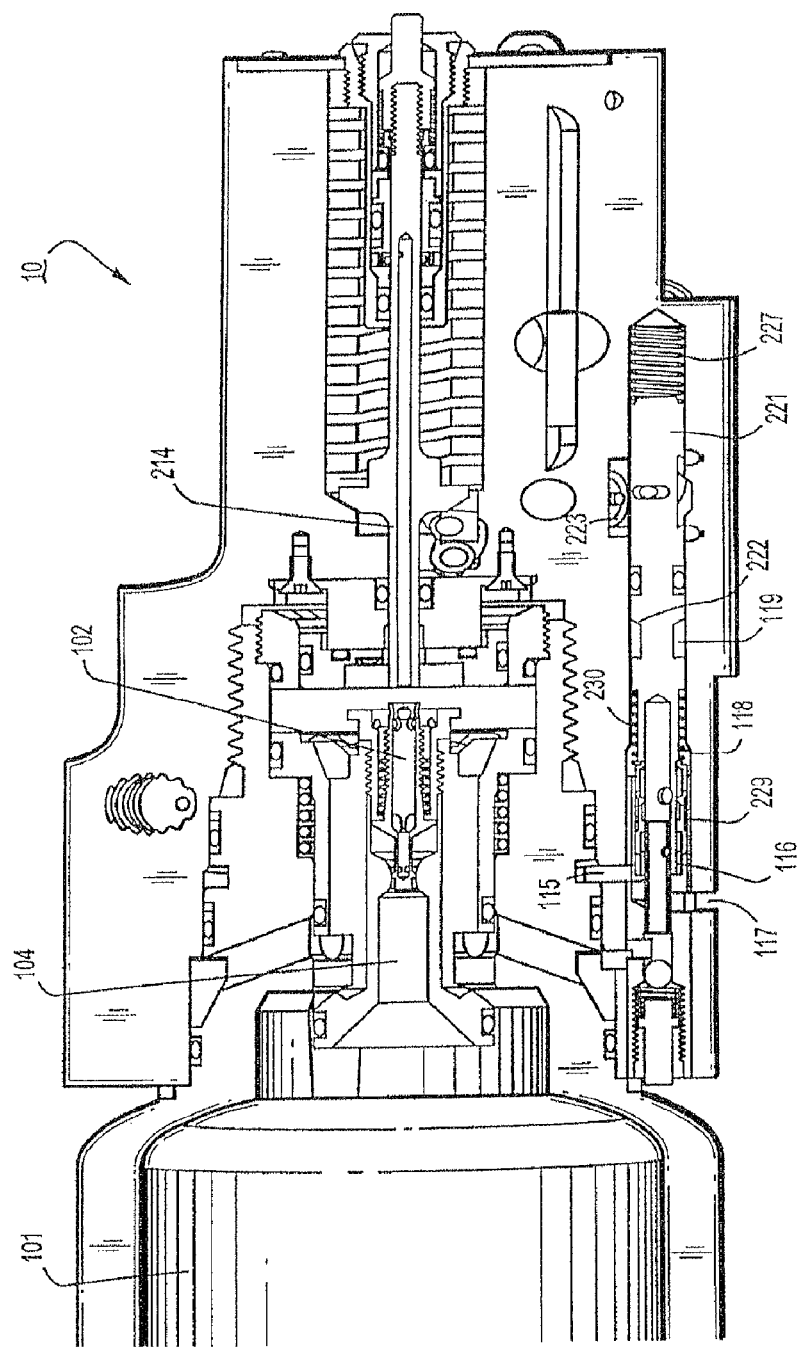
FIG. 16 is a right side sectional view of the gas supply system after actuation, with an open main valve, and showing a sequencing valve, according to an embodiment of the present invention.

Referring to FIG. 16, after actuation, as the sequencing valve rod 221 moves (to the right in the drawing) due to movement of the shaft 219 and rotation of the bell-crank 223, the sliding valve shroud 229 also moves (to the right in the drawing), thereby creating a pathway from port 117 to atmosphere to connecting port 115, so as to connect/vent the main valve control chamber 110 to outside atmosphere.

Pressure (i.e., GSV gas pressure) builds in a trapped volume area 116 to further retract shroud 229 (to the right in the drawing). The pressure to the right of the shroud 229 at area 118 remains at atmosphere. At this point, a pressure differential is created on the main valve poppet 104, whereby the pressure is at atmospheric pressure on one side of the main valve poppet due to the vent to atmosphere, and at gas pressure from the GSV 101 on the other side of the main valve poppet. The pressure differential is in place prior to the retraction of the plunger 214 so that the main valve remains open after the plunger 214 retracts. Once the plunger 214 retracts, the shroud 229 remains open due to the trapped volume in area 116 having high pressure, while pressure on the other side of the shroud 229, at area 118, remains at atmosphere.

As gas pressure is rapidly increasing in the discharge port 216, a port directs a small amount of gas from the discharge port 216 to an opening in the sequencing valve rod 221 aligned with the discharge port 216, and down the rod to the small trapped volume 116 which acts on a piston attached between the sequencing valve rod 221 and the sliding valve shroud 229. This gas retracts the shroud 229 even further, insuring that the GSV main valve control chamber 110 remains at atmospheric pressure during the remainder of the gas delivery event, even though the plunger 214 may have retracted.

Figure 17:
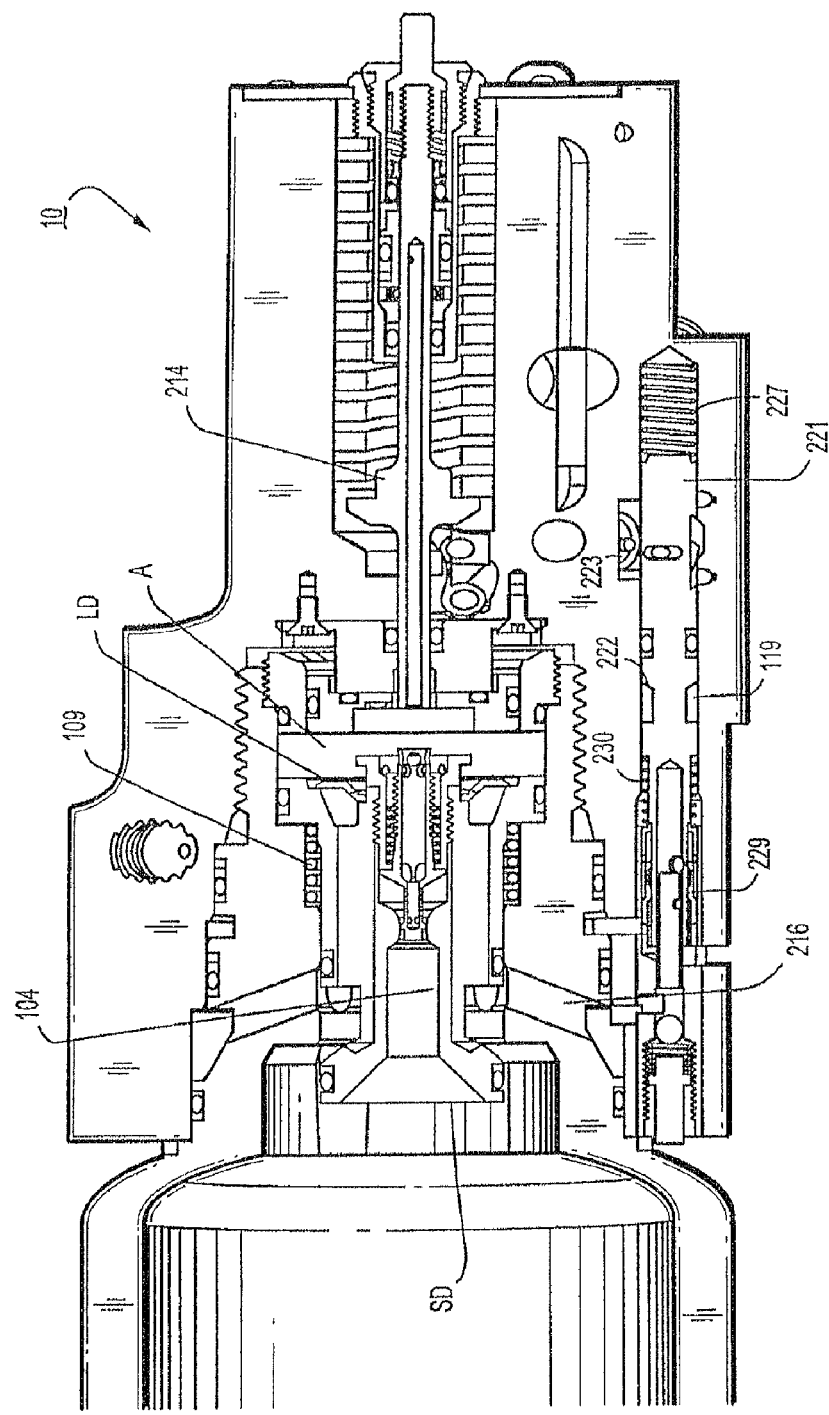
FIG. 17 is a right side sectional view of the gas supply system after actuation, with an open main valve, and showing a sequencing valve, according to an embodiment of the present invention.

Referring to FIG. 17, the plunger 214 has retracted, and gas continues to flow out of GSV 101 through discharge port 216 until the operation of the store ejection mechanism is complete, and then the flow drops to near zero. Although the sequence valve rod 221 extends (back to the left in the drawing) as the plunger 214, retracts, the trapped volume at area 116 keeps the sliding shroud 229 retracted enough to continue to vent the control chamber 110 to atmosphere, thereby keeping the main valve open. At this point, pressurized gas from the system leaks into chamber 119 (to the right of the shroud 229 in the drawing), at least in part due to holes 222 in the sequencing valve rod 221. It is to be understood that in some cases, the control chamber 110 may continue to be vented until well after the launch sequence is completed.

Figure 18:
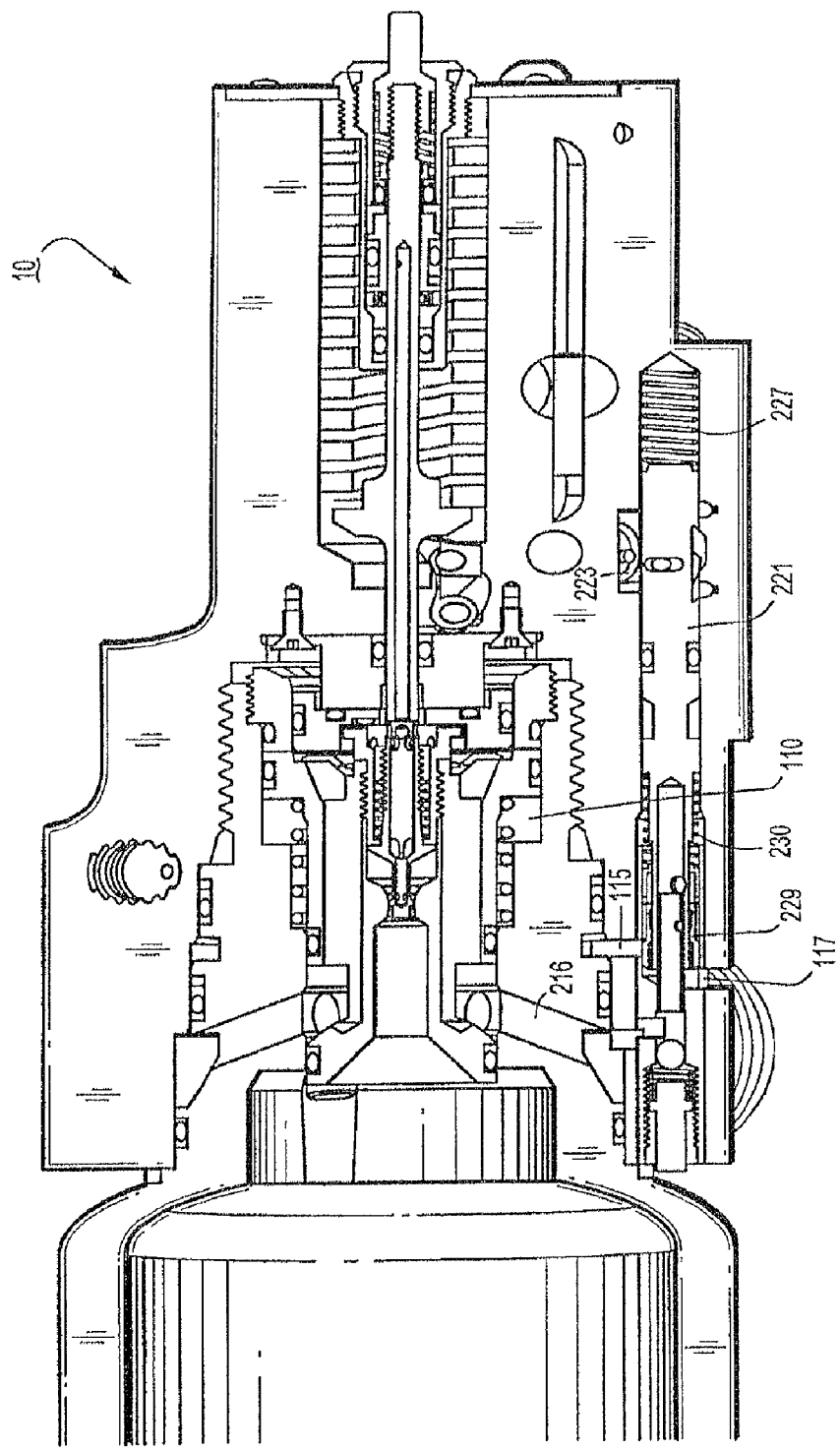
FIG. 18 is a right side sectional view of the gas supply system after actuation, with a closed main valve, and showing a sequencing valve, according to an embodiment of the present invention.
Figure 19:
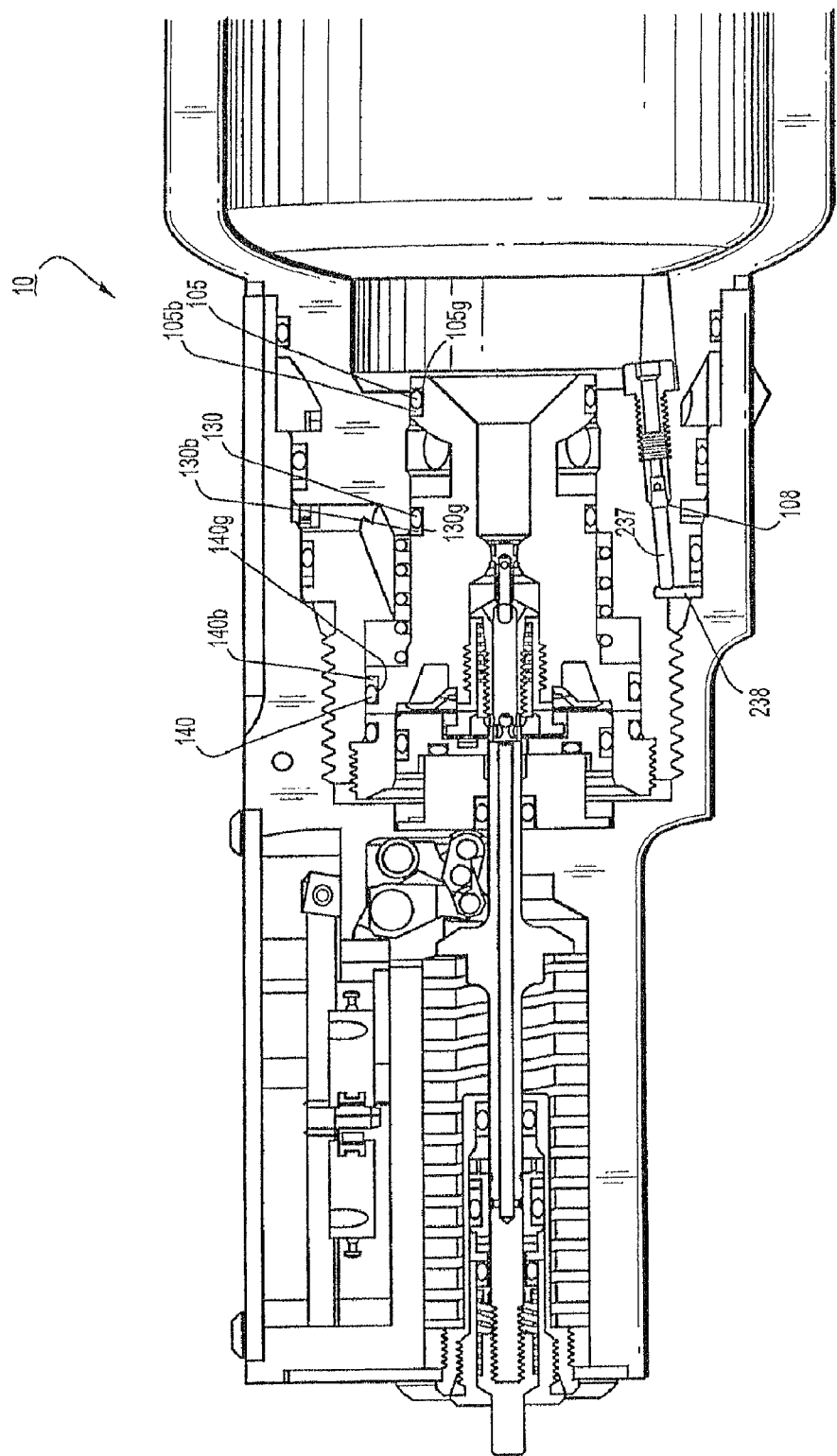
FIG. 19 is a right side sectional view of the gas supply system illustrating seals, according to an embodiment of the present invention.

Referring to FIG. 18, due to the pressure increase in chamber 119, bleeding of the trapped volume to atmosphere, and the biased force of shroud spring 230, the shroud 229 is pushed back (to the left in the drawing), thereby blocking the vent to the atmosphere. As a result, the control chamber 110 is re-connected to the discharge port pressure, and pressure in the control chamber increases to above atmosphere to equalize pressure on both sides of the main valve poppet 104 so that the main valve spring 109 can close the main valve. The time for the main poppet 104 to return to its original position and close the main valve can be set so that full drain of gas from the GSV 101 is prevented so that the GSV 101 may be re-used for another bomb drop. Remaining gas in the GSV 101 is saved as pressure downstream of the discharge port 216 bleeds away.

When the shroud 229 shifts, the control chamber 110 is closed to atmospheric pressure by blocking port 115, and then switched to outlet port pressure. With outlet port pressure on both sides of the large piston on the GSV main poppet 104, the poppet 104 closes from the retracted position. This prevents the GSV 101 from losing any more of the stored gas in the vessel 101. System pressure outside of the bottle 101 now begins to leak out of the system, eventually returning to atmospheric pressure.

Referring to FIGS. 21-26, a valve system 50 including a push-seal assembly, according to an embodiment of the present invention, is shown. Like the gas supply system 10, the valve system 50 includes a source of pressurized fluid 501, and a receiving portion 600 including a housing 601. The source of pressurized fluid 501 includes an orifice 591 through which the pressurized fluid, for example, liquid (such as oil) or gas, escapes. The source of pressurized fluid may be a container, like the GSV 101, but is not limited thereto. The source 501 can be any space or void in which pressurized fluid collects, such as a conduit or tank in a valve system. The valve system 50 may be, for example, a relief valve, a check valve, a shut off valve, a regulator, a solenoid valve, or any other valve assembly where pressurized fluid is released from a source or specific area.

The valve assembly includes a poppet 504, a poppet spring 617, a spring seat 687 and a push-button 688. Fluid is stored in the source 501, and is released upon actuation of a release poppet 504 by the push-button 688. Like the seals 103, 105, 108, 130 and 140, low leakage seal 505 allows long term storage of fluid in the source 501. For example, the source 501 may have a 10 year storage life without significant loss of fluid pressure. The poppet 504 includes the O-ring seal 505, and a back-up ring 505*b* positioned in O-ring groove 505*g*, and an intermediate O-ring seal 585, and a back-up ring 585*b* positioned in O-ring groove 585*g*. The intermediate seal 585 is a backup seal to prevent leakage when the valve is opened. The O-ring seals and back-up rings, which are made of, for example, rubber, provide very low leakage seals and plug orifices 591 and 691 along the poppet 504 of the valve system 50. The seal 505 is pushed into the pressure stream and held in the O-ring groove by the pressure exerted by the fluid leaving the source 501. The seal 585 performs the function of sealing the orifice 691, preventing external leakage when seal 505 is pushed forward, opening the valve. The thicknesses $t_1$ and $t_2$ of the O-rings are greater than the depths $d_1$ and $d_2$ of the O-ring grooves so that the O-rings may also function as poppet seats.

The groove 505*g* is formed along an outer circumference of the poppet 504 in a substantial U-shape, and right and left sides 595, 596 of the groove 505*g* protrude from an outer wall of the poppet 504. The groove 585*g* is recessed into an outer wall of the poppet 504 and is formed in a substantial U-shape. The configuration and shape of the grooves 505*g* and 585*g* may be varied.

Standard O-ring seals can be used for low leakage valve design. Because the poppet 504 is pushed into the pressure stream of the source 501, the O-ring 505 is not forced off, and instead, is held in place by the pressurized fluid. In other words, by pushing the poppet 504 into the pressure source 501, the soft rubber seal 505 is not stripped from the poppet by the pressure. Use of a soft rubber seal 505 allows very low leakage rates, which provides very long storage life, while still allowing quick release of the fluid.

Referring to FIGS. 27-30, the pilot valve and main valve poppets 102 and 104 are shown in enlarged form. As can be seen from FIGS. 27-30, the seals 103, 105, 130 and 140 include O-rings and back-up rings 103*b*, 105*b*, 130*b* and 140*b* formed in respective grooves 103*g*, 105*g*, 130*g*, and 140*g*. The pilot valve and main valve poppets 102, 104 including the seals 103, 105, 130 and 140 can be used, alone or in combination, in any valve system in connection with, for example, gas or oil, where the a poppet(s) is pushed into a pressure source.

It is to be understood that the use of the low leakage seals 505 or 585 (or 103, 105, 108, 130 and 140) is not limited to the illustrated configuration of the valve system 50 or gas supply system 10. The low leakage seal configuration of the embodiments of the present invention is contemplated for any valve system where a poppet is pushed into a pressure source or stream, and may be used in hydraulic as well as pneumatic systems.

Although exemplary embodiments of the present invention have been described hereinabove, it should be understood that the present invention is not limited to these embodiments, but may be modified by those skilled in the art without departing from the spirit and scope of the present invention, as defined in the appended claims.

What is claimed is:

1. A valve system, comprising:
   a container comprising pressurized fluid and an orifice; and
   a poppet comprising a groove, an O-ring positioned in the groove, and a back-up ring positioned in the same groove as and adjacent the O-ring, wherein the O-ring seals the orifice when the poppet is in a closed position, and wherein the poppet including the O-ring and the back-up ring moves into the container through the orifice to allow the pressurized fluid to escape from the container through the orifice, and wherein a diameter of a leading end of the back-up ring is the same as a diameter of a trailing end of the back-up ring.

2. The valve system of claim 1, wherein the pressurized fluid is a gas or a liquid.

3. The valve system of claim 1, wherein a thickness of the O-ring is greater than a depth of the groove.

4. The valve system of claim 1, wherein the groove is formed along an outer circumference of the poppet.

5. The valve system of claim 1, wherein the groove is formed in a substantial U-shape and right and left sides of the groove protrude from an outer wall of the poppet.

6. The valve system of claim 1, wherein the groove is recessed into an outer wall of the poppet.

7. The valve system of claim 6, wherein the groove is formed in a substantial U-shape.

8. A valve system, comprising:
   a source of pressurized fluid comprising an orifice through which the pressurized fluid flows away from the source; and
   a poppet comprising a groove and a seal positioned in the groove, wherein the seal plugs the orifice when the poppet is in a closed position, and wherein the poppet and the seal move through the orifice against a flow of the pressurized fluid to allow the pressurized fluid to flow through the orifice and away from the source, wherein the seal includes an O-ring, and wherein the poppet further comprises a back-up ring positioned in the same groove as and adjacent the O-ring, and wherein a diameter of a leading end of the back-up ring is the same as a diameter of a trailing end of the back-up ring.

9. The valve system of claim 8, wherein the pressurized fluid is a gas or a liquid.

10. The valve system of claim 8, wherein a thickness of the seal is greater than a depth of the groove.

11. The valve system of claim 8, wherein the groove is formed along an outer circumference of the poppet.

12. The valve system of claim 8, wherein the groove is formed in a substantial U-shape and right and left sides of the groove protrude from an outer wall of the poppet.

13. The valve system of claim 8, wherein the groove is recessed into an outer wall of the poppet.

14. The valve system of claim 13, wherein the groove is formed in a substantial U-shape.

15. A seal assembly for plugging an orifice in a valve, comprising:
   a body comprising a groove;
   an O-ring positioned in the groove, and a back-up ring positioned in the same groove as and adjacent the O-ring, wherein the body including the O-ring and the back-up ring is moved through the orifice against a flow of pressurized fluid to open the seal assembly and allow the pressurized fluid to flow through the orifice, and wherein a diameter of a leading end of the back-up ring is the same as a diameter of a trailing end of the back-up ring.

16. The seal assembly of claim 15, wherein the valve is one of a relief valve, a check valve, a solenoid valve, a shut-off valve or a regulator.

17. The seal assembly of claim 16, wherein the body is a poppet.

18. The seal assembly of claim 15, wherein the pressurized fluid is a gas or a liquid.

19. A seal assembly for plugging an orifice in a valve, comprising:

a body comprising a groove;

an O-ring positioned in the groove, and a back-up ring positioned in the same groove as and adjacent the O-ring, wherein the body including the O-ring and the back-up ring is moved through the orifice against a flow of pressurized fluid to open the seal assembly and allow the pressurized fluid to flow through the orifice, and wherein a variation of a diameter from a leading end to a trailing end of the back-up ring occurs along a continuous curve.

\* \* \* \* \*